US011975475B2

(12) United States Patent
DeFranks et al.

(10) Patent No.: US 11,975,475 B2
(45) Date of Patent: May 7, 2024

(54) SYSTEM AND METHOD OF MANUFACTURING FIBER BASED ARTICLES WITH STEAM MOLDING

(71) Applicant: Piana Nonwovens, LLC, Cartersville, GA (US)

(72) Inventors: Michael Stephen DeFranks, Cartersville, GA (US); Eric McCann, Cartersville, GA (US); Andy Hollis, Cartersville, GA (US); Andrea Fumagalli, Nembro (IT); Sergio Battista Gastaldi, Nembro (IT); Matteo Radi, Nembro (IT)

(73) Assignees: PIANA NONWOVENS LLC, Cartersville, GA (US); PERSICO S.P.A., Nembro (IT)

( * ) Notice: Subject to any disclaimer, the term of this patent is extended or adjusted under 35 U.S.C. 154(b) by 0 days.

(21) Appl. No.: 17/547,362

(22) Filed: Dec. 10, 2021

(65) Prior Publication Data
US 2022/0184874 A1    Jun. 16, 2022

Related U.S. Application Data

(60) Provisional application No. 63/123,567, filed on Dec. 10, 2020.

(51) Int. Cl.
*B29C 51/44*    (2006.01)
*B25J 15/06*    (2006.01)
(Continued)

(52) U.S. Cl.
CPC ......... *B29C 51/004* (2013.01); *B25J 15/0616* (2013.01); *B29C 35/049* (2013.01); *B29C 51/424* (2013.01); *B29C 51/44* (2013.01)

(58) Field of Classification Search
CPC . B25J 15/0616; B25J 15/0691; B29C 51/004; B29C 35/049; B29C 43/50;
(Continued)

(56) References Cited

U.S. PATENT DOCUMENTS

2009/0321002 A1    12/2009 Spengler

FOREIGN PATENT DOCUMENTS

WO    2020012721 A1    1/2020
WO    2020190831 A1    9/2020

OTHER PUBLICATIONS

Machine Translation of WO 2020/012721 (Unipress) Document Publication date of Jan. 16, 2020.*

* cited by examiner

*Primary Examiner* — Monica A Huson
(74) *Attorney, Agent, or Firm* — WCF IP

(57) ABSTRACT

In an example method, a NWM molding blank, including a non-woven material held in compression by a binder, is placed in a separable mold, and heated to a melting temperature of the binder. The molding blank expands, forming as an intermediate NWM object a NWM molded object with a 3D geometric form. The intermediate NWM object is cooled through a temperature band with an upper boundary and a lower boundary, and further cooled to a solidifying temperature of the binder. The upper boundary is above the solidifying temperature and the upper boundary is lower than the binder melting temperature. While in the temperature band, the mold is separated, rendering accessible an exposed surface of the intermediate NWM object. The object is then transported to a contoured forming surface of a forming base, by an actuatable arm having an end effector gripping the exposed surface via vacuum suction, lifting the object from the mold and placing the object on the contoured forming surface. Optionally, the end effector contact surface
(Continued)

includes a final forming feature. The actuatable arm compresses the intermediate NWM object against the contoured forming surface, and the optional end effector final forming feature and continues compressing until cooling to the solidifying temperature.

19 Claims, 19 Drawing Sheets

(51) Int. Cl.
*B29C 35/04* (2006.01)
*B29C 51/00* (2006.01)
*B29C 51/42* (2006.01)

(58) Field of Classification Search
CPC ..... B29C 43/14; B29C 37/0007; B29C 51/44; B29C 51/424; B29C 2043/5046; B29C 59/02
See application file for complete search history.

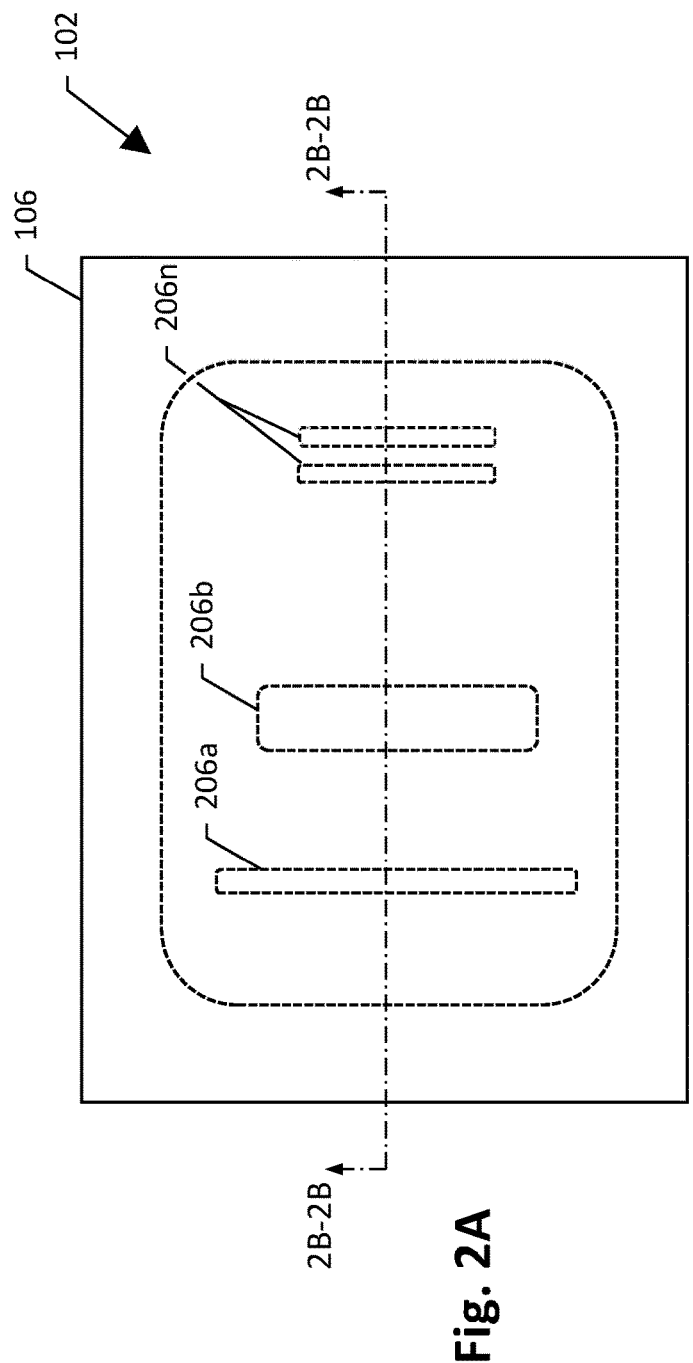
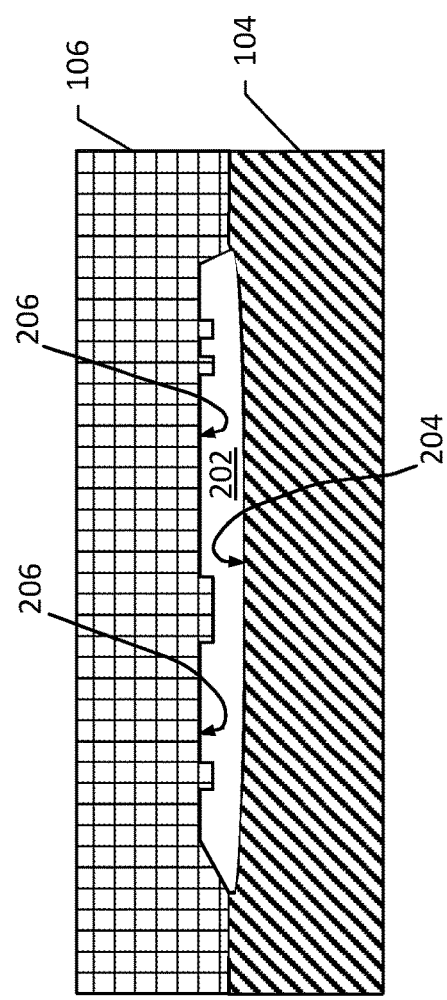
Fig. 2A
Fig. 2B

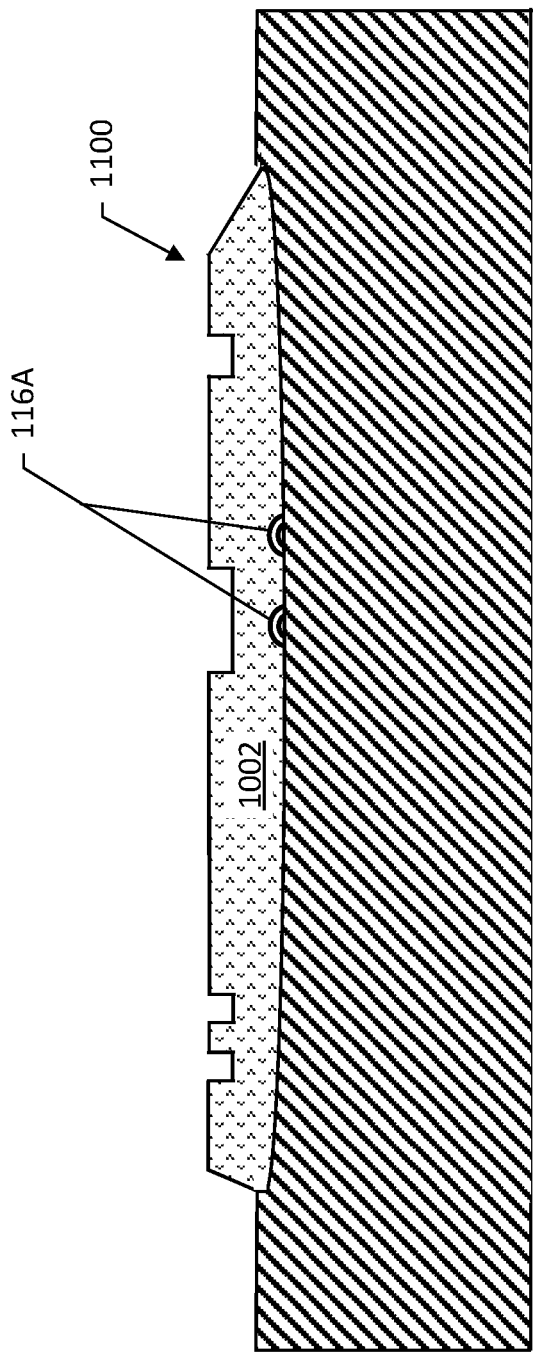

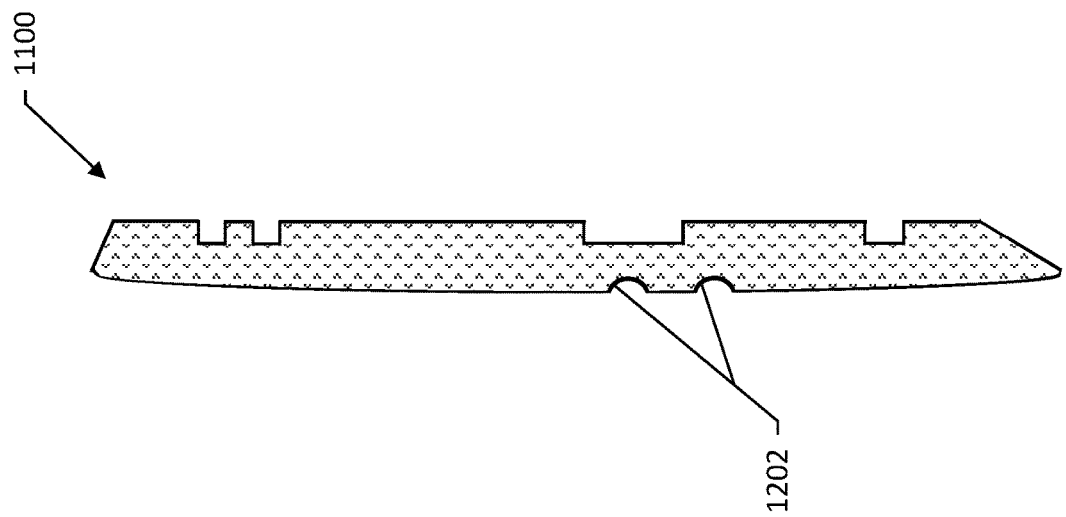
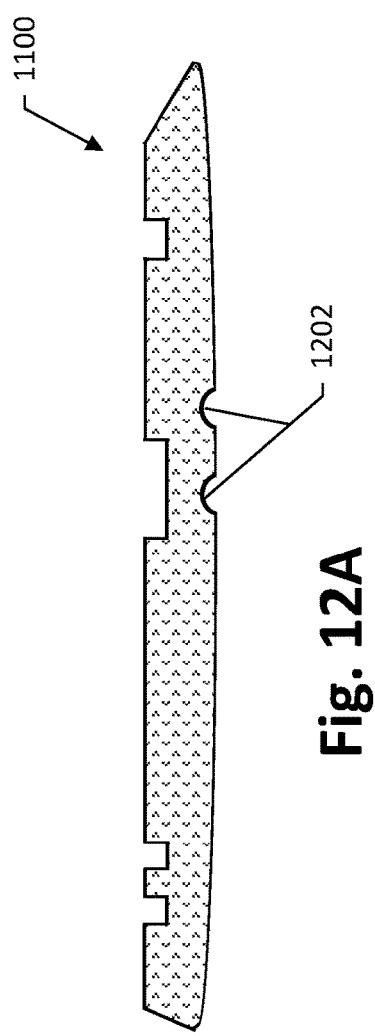

SYSTEM AND METHOD OF MANUFACTURING FIBER BASED ARTICLES WITH STEAM MOLDING

CROSS-REFERENCE TO RELATED APPLICATIONS

This application claims priority to U.S. Provisional Application 63/123,567 filed Dec. 10, 2020, which is hereby incorporated by reference in its entirety.

TECHNICAL FIELD

This invention generally relates to molding three dimensional objects or portions thereof, and more particularly to molding objects or portions thereof using blanks of compressed heat expanding nonwoven materials.

BACKGROUND

U.S. Patent Publication PCT/US2020/022893 ("the '893 publication"), the entire disclosure of which is included in U.S. Provisional Application 63/123,567, describes techniques for molding heat-expanding blanks (e.g., boards) comprising certain nonwoven materials held in compression by certain solidified binders, into objects of various three-dimensional (3D) shape. As described in the '893 publication, the compression state in which the solidified binders hold the nonwoven material stores substantial kinetic energy. As also described, the melting temperature of the binders is lower than the melting temperature of the nonwoven materials. Therefore, heating the blanks to a temperature between the two melting points releases the nonwoven material to expand toward its precompression state.

As described in the '893 publication, molding of heat-expanding, non-woven material molding blanks (hereinafter also referenced as "HE NWM blanks") can employ a two-part separable mold, for example, comprising an upper part and lower part that, when assembled, form a mold interior with a contoured surface matching the desired 3D shape. In the molding process, the mold parts are separated (e.g., by raising the upper part from the lower part), making the contoured surface in the lower part accessible. One or more HE NWM blanks are placed on the accessible contoured mold surface of the lower part, the mold is re-assembled (e.g., by lowering the upper part onto the lower part), enclosing the mold interior around the one or more mold blanks, and heat is applied, for example, by introduction of steam into the mold interior via steam passages. When the temperature of the HE NWM blanks reaches the binder melting temperature, the binder becomes liquid, releasing the nonwoven material from its compression state. The non-woven material expands outward, through force of the kinetic energy stored in the compression, toward the HE NWM blank's pre-compressed dimensions, until reaching the contoured surfaces of the mold's interior. Next, by operations such as terminating the heat and introducing air flow, lapse of time, the temperature of the now expanded NWM and the binder decreases to lower than the binder melting temperature and, eventually, to the binder solidification temperature. The molded NWM 3D object may then be removed from the mold.

In certain applications, a shortcoming of the above-referenced techniques is that there can be some change in the shape of the molded NWM 3D object after removal from the mold.

SUMMARY

Embodiments provide high throughput capable first stage molding, and a second stage multi-configurable feature augmentation and finishing. Benefits and advantages provided by two-stage HE-NWM molding in accordance with various embodiments include, for example, and without limitation, removability of 3D objects molded from HE-NWM mold blanks, from their form molds, prior to fully cooling to the binder solidification temperature. Secondary benefits can include, but are not limited to, higher throughput of the first stage HE-NWM molding process, by removing the need to wait until the product has fully cooled before removal.

Features and advantages also include, as provided by an actuatable arm, contoured contact surface end effector, and final forming surfaces in accordance with various embodiments, maintaining an inherently optimal distribution of form stabilizing forces on the final formed NWM 3D object until the object has fully cooled to the binder material solidification state, and doing so without occupying the heated molding resource.

Other features and advantages include heat expansion molding for vertical sidewall NWM 3D objects using relief-angled mold sidewalls, i.e., angled back from the end product vertical. This can avoid difficulties in post-molding lifting the mold upper component and in removing the molded NWM object from the lower component.

An example of disclosed methods according to various embodiments includes a method for molding an object, and which can comprise: heat expanding a compressed nonwoven material (NWM) molding blank within a separable mold, forming an intermediate NWM molded three-dimensional (3D) object; cooling the intermediate NWM molded 3D object, through a temperature band having an upper boundary and a lower boundary, and further cooling to a solidifying temperature of the binder, the lower boundary being higher than a solidifying temperature of the binder and the upper boundary being lower than the binder melting temperature. The example method further includes, while in the temperature band: separating the separable mold, making accessible an exposed surface of the intermediate NWM molded 3D object, gripping the intermediate NWM molded 3D object, by vacuum suction from an end effector of an actuatable arm, transporting the gripped intermediate NWM molded 3D object to a forming surface of a forming base, by transport movements of the actuatable arm, and compressing at least a portion of the intermediate NWM molded 3D object against the forming surface, and further comprises finishing the intermediate NWM molded 3D object, by continuing the compressing at least the portion of the intermediate NWM molded 3D object against the forming surface until cooling to the solidifying temperature.

An example of disclosed systems according to various embodiments includes an end effector apparatus for retrieving an expandable object from a mold, wherein the mold has a top inner surface and a bottom inner surface, and each surface faces the expandable object, comprising an expandable object contacting surface resembling at least a portion of the top inner surface of the mold; at least one robotic arm connected to the expandable object contacting surface, wherein the robotic arm is configured to move the expandable object contacting surface to contact a top portion of the expandable object; and at least one vacuum suction system connected to the expandable object contacting surface, wherein the at least one vacuum suction system is configured to withdraw heat and moisture while providing sufficient vacuum to hold the expandable object against the expandable object contacting surface.

An example of disclosed systems according to various embodiments includes a separable mold, comprising a lower component and an upper component that, when assembled, form a molding chamber, and includes steam passages for receiving a supplied steam and conveying at least a portion of the steam to the molding chamber. The mold is configured to enclose within the molding chamber, when assembled, one or more HE-NWM blanks that can comprise a compressed NWM within a solidified binder material. The mold is configured to effectuate, responsive at least in part to the supplied steam, a heat molding of HE-NWM blanks, fills the molding chamber to form an intermediate molded 3D NWM object. The example system can include a mold separating apparatus, configured for separating the upper component from the lower component, leaving the intermediate molded 3D NWM object supported by the lower components, with an exposed top surface. The example system further includes an end effector, connected to an actuatable arm, and featuring a contact surface that conforms to a contour of the exposed top surface. The actuatable arm is configured perform a transporting of the intermediate molded 3D NWM object, e.g., in response to control signals from a control controller, and to position the contact surface against the exposed top surface, and to establish a vacuum gripping by the contact surface of the exposed top surface, via vacuum passages than open at the contact surface, lift the intermediate molded 3D NWM object from the lower component of the mold, and transport the intermediate molded 3D NWM object to a contoured lower final forming surface of a forming base adjacent the separable mold. The actuatable arm, the end effector, the contact surface of the end effector, and the contoured lower supporting surface are also configured to exert particular pressure on the intermediate molded 3D NWM object, for feature augmentation and finish forming, and maintain stabilizing pressure on the final form NWM molded 3D object until the binder material fully solidifies.

Another example of disclosed methods according to various embodiments includes a method of molding an object, comprising: providing a mold, the mold including a top portion and a bottom portion, wherein the mold is configured to deliver heat from steam to the top portion and the bottom portion of the mold, and wherein the mold is configured to exhaust moisture from inside the mold by vacuum suction; placing the expandable object in the mold to form a configuration using the heat from steam when the top portion is placed on the bottom portion of the mold with the expandable object positioned between the top portion and the bottom portion of the mold. The example method further comprises withdrawing the heat and moisture from the mold by applying vacuum suction to the mold during and/or after molding; and opening the mold so that the top portion separates from the bottom portion of the mold to expose at least some portion of the expandable object while the expandable object remains positioned on the bottom portion of the mold. The example method also includes placing an expandable object contacting surface of an end effector apparatus onto the exposed portion of the expandable object while applying vacuum suction sufficient to cool and hold the expandable object against the expandable object contacting surface of the end effector apparatus, wherein the expandable object contacting surface of the end effector apparatus sets the configuration to a first configuration by cooling and holding; and retrieving the first configuration expandable object from the bottom portion of the mold.

This Summary identifies example features and aspects and is not an exclusive or exhaustive description of disclosed subject matter. Whether features or aspects are included in or omitted from this Summary is not intended as indicative of relative importance of such features or aspects. Additional features are described, explicitly and implicitly, as will be understood by persons of skill in the pertinent arts upon reading the following detailed description and viewing the drawings, which form a part thereof.

BRIEF DESCRIPTION OF THE DRAWINGS

FIG. 2A shows a top plan view, and FIG. 2B is a front elevation view on the FIG. 2A cross-cut projection 2B-2B, of an example assembled separable mold 200 for molding processes in accordance with one or more embodiments.

FIG. 11 shows a front crosscut view an example finished NWM 3D molded object after the FIG. 10 illustrated second stage augmentation and finishing cools the finished NWM 3D molded object below the binder solidification temperature, fixing the 3D molded object's form and dimensions, and the actuatable arm has removed the end effector.

FIGS. 12A and 12B show a first rotation and a second rotation view of a finished NWM 3D molded object produced by the described example two-stage HE-NWM molding process according to one or more embodiments.

DETAILED DESCRIPTION

Figure 1:
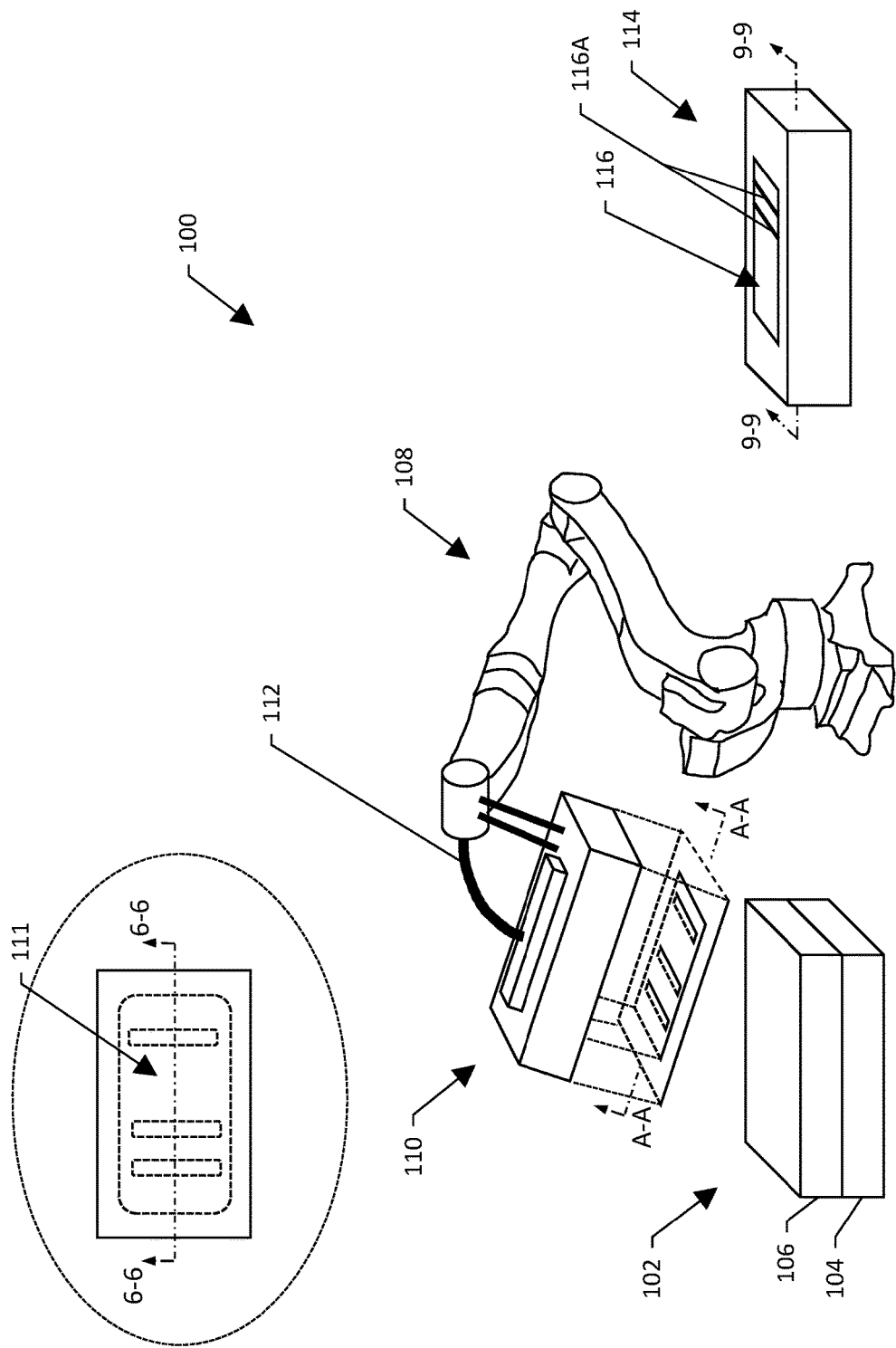
FIG. 1 is a functional block schematic of one example implementation of a system supporting a two-stage HE-NWM molding process, in accordance with one or more exemplary embodiments.

FIG. 1 is a functional block schematic of one example implementation of a system 100 that can support a two-stage HE-NWM molding process, in accordance with one or more exemplary embodiments. The system 100 includes a separable mold 102 that can comprise an upper component 106 and a lower component 104. As described in more detail in reference to FIGS. 2A and 2B, the upper component 106 and the lower component 104 can be formed to accommodate, on a generally upward facing lower molding surface provided on the lower components, one or more HE-NWM molding blanks and the upper component 106 can be configured with a generally downward facing upper molding surface that, when the mold 102 components are assembled, complements the lower component 104 molding surface to form a molding chamber, enclosing the one or more molding blanks. The lower component 104 and the upper component 106 can include steam passages, as described in more detail in later sections and in the '837 publication, for molding processes, to both distribute supplied steam within and thereby heat the separable mold 102 components, and to convey the supplied steam into the molding chamber, to directly heat the HE-NWM molding blank.

The system 100, according to various embodiments, also include an actuatable robotic arm 108, alternatively referenced herein for brevity as "actuatable arm" 108 and, connected to a distal end of the actuatable arm 108, an end effector 110. Arranged on a portion of the end effector 110 that, in the FIG. 1 orientation and positioning of the actuatable arm 108 faces downward, is a contact surface, examples of which are described in more detail in reference to FIGS. 6-10, FIGS. 14-15, and elsewhere herein. In overview, the contact surface can be contoured to conform to an upper surface of the 3D object that will be molded in the separable mold 102, using one or more HE NWM material blanks. The effector end 110 also includes a vacuum suction channeling system, extending from a connection of the vacuum suction tube 112 to a plenum chamber or equivalent, such as represented by the rectilinear housing shown atop a upper housing of the end effector 110, and from an internal volume of the plenum chamber or equivalent, via tubes or passages within the end effector 110, to vacuum passage openings on the contact surface.

Functionalities of the actuatable arm 108 and end effector 110 include, in accordance with various embodiments, transporting, post HE-NWM steam-heated molding, an NWM molded 3D object from the lower component 104 to an adjacent final forming lower structure or base 114, followed by placing the NWM molded 3D object onto a lower final forming surface 116 of the structure 114. Example actuatable arm 108 movements for such transport and placement can be performed, for example, under control of a control processor, e.g., within the actuatable arm 108 or connected thereto by a network. Operations can include positioning the contact surface of the end effector 110, by movements of the actuatable arm 108, on the upper exposed surface of the NWM molded 3D object, activating a suction gripping of the upper surface by the contact surface, e.g., by controlling vacuum flow valves, followed by lifting the gripped NWM molded 3D object and manipulating the arm 108 to position the object above and onto the lower final forming surface 116.

It will be understood that a substantial feature in two-stage HE-NWM molding processing in accordance with various embodiments is initiating the second stage processing, e.g., transporting the NWM molded 3D object to the lower final forming surface 116, after the NWM molded 3D object has cooled below an upper boundary of a temperature band that s termed herein, for purposes of convenience and consistency, as "a secondary forming temperature band."

The upper boundary is below the melting temperate of the binder material, but above the solidification temperature of the binder material.

Processes in accordance with various embodiments, provide, among other features exploitation of a certain workability of the NWM molded 3D object while within the secondary forming temperature band.

Features and advantages also include, as provided by the actuatable arm 108 and the end effector 110, in combination with the lower final forming surface 116 include maintaining optimally distributed form stabilizing forces on the final formed NWM 3D object until the object has fully cooled to the binder material solidification state.

Functionalities of the actuatable arm 108 and end effector 110 also include what is alternatively referenced herein, for purposes of description, as "augmentation and finish forming processes."

Features of the system 100, according to one or more embodiments, providing such functionalities include contouring of the contact surface of the end effector and contouring of the lower final forming surface 116. Other features, in accordance with various embodiments, can include arrangement of attachment pieces, ornamental pieces, and other items and devices, with the end effector 110, on the lower final forming surfaces 116, both, for compression embedding in the NWM molded 3D object prior to cooling below the temperature band.

Another feature in two-stage HE-NWM molding processing in accordance with various embodiments is completion of the augmentation and final forming process, or at least substantial completion other than minor forming, prior to the NWM molded 3D object cooling to below the lower boundary of the band, or at least prior to having cooled such that further forming carries unacceptable costs. Example costs can include unacceptable risk of causing structure defects in the final formed NWM 3D object. Costs can also include, for example reduction in tool life, or actuatable arm 108 life due to wear and tear resulting from higher forces required for forming at lower temperatures.

FIG. 2A shows a top view, and FIG. 2B front a front crosscut view on the FIG. 2A cross-cut projection 2B-2B, of an example assembled implementation of the FIG. 1 two-part separable mold 100. The FIG. 2 implementation includes an example implementation of the lower component 104 and the overlaying upper component 106. Complementary interior surfaces of the assembled lower component 104 and overlaying upper component 106 enclose a mold interior 202. The mold interior 202 molding surfaces include a contoured bottom molding surface 204 formed by features in an upper portion of the lower component 104, complemented by a contoured top molding surface 206 formed by features in a lower portion of the upper component 106. For purposes of description, the contoured bottom molding surface 204 and the contoured top molding surface 206 will also be collectively referenced as "contoured interior molding surfaces 204/206."

It will be understood that the FIGS. 2A and 2B illustrations of the contoured interior molding surfaces 204/206 are generic representations of what can be, in various applications and implementations, complex geometric shapes and forms.

For purposes of illustration, the contoured top molding surface 206 includes an arbitrary configuration of molding features, including a first top surface molding feature 206a, a second top surface molding feature 206b, and optional other features 206n, of which only an nth top surface molding feature 206n is visible.

Figure 3:
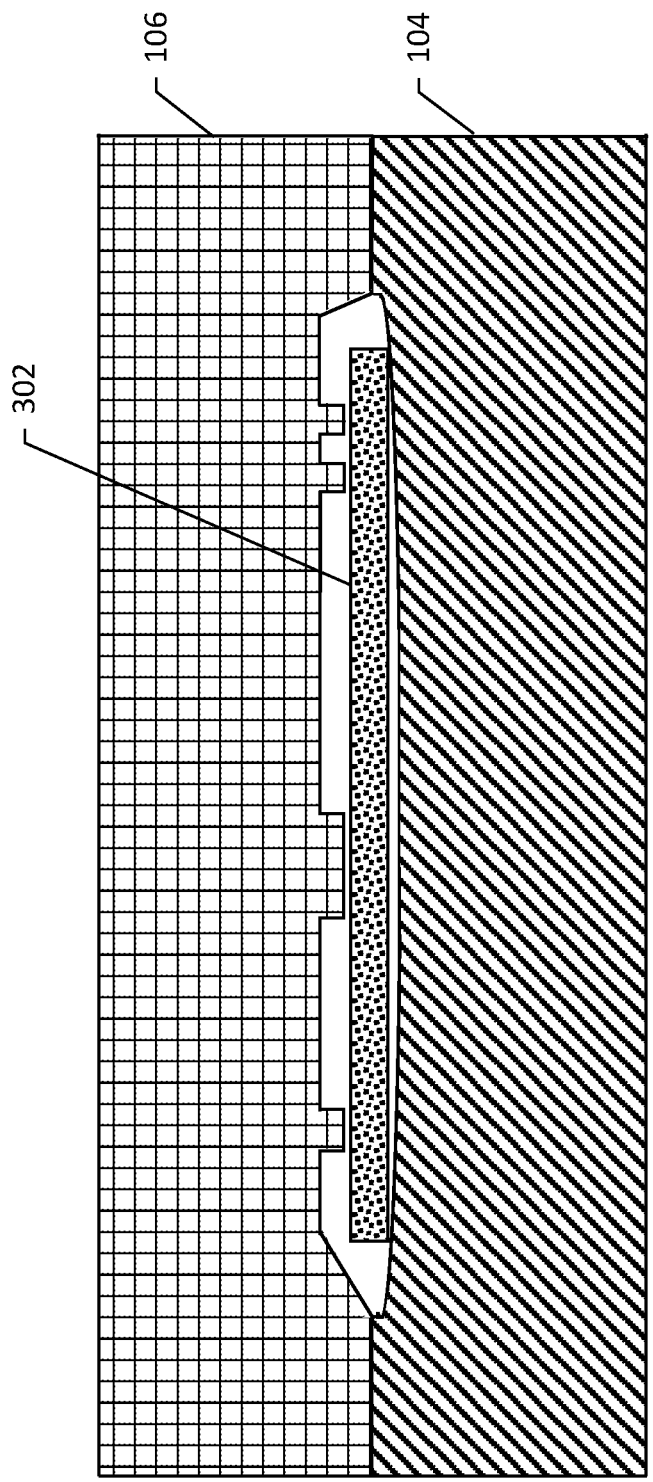
FIG. 3 is an enlarged front crosscut view, on the FIG. 2A cross-cut projection 2B-2B, of the example separable mold, with an example compressed, HE-NWM molding blank in the mold interior.

FIG. 3 is a front elevation view, on the FIG. 2A cross-cut projection 2B-2B, of the FIG. 2A-2B example two-part separable mold 102, with an illustrative compressed, heat expandable non-woven material (HE-NWM) mold blank 302 placed in the mold interior.

Example processes in methods according to various disclosed embodiments, including an example that starts with the FIG. 3 HE-NWM mold blank 302 in the example two-part separable mold 102, will be described in paragraphs below.

Before moving to further description of example features and processes of systems and methods according to various embodiments, certain features, selections, and options for examples of compressed HE-NWM mold blanks as may be used in practices of such systems and methods will be described in reference to the appended FIGS. 3 through 12b. Further description, for example, for academic purposes, may be found in publications referenced in the '893 publication.

In overview, forming of an example implementation of an HE-NWM mold blank 302 can start with a nonwoven material. The nonwoven material can be fabricated from a mass of fibers, comprising binder fibers and one or more other fibers. The binder fibers can be, for example, polyesters such as ELK®, E-PLEX®, and EMF type high elastic LMF, which are commercially available from Teijin Limited, Toray Chemical Korea Inc., and Huvis Corporation, respectively. These example binder fibers have a melting temperature, for example, of 80-150° C., which is below the melting or decomposition temperature of the one or more other fibers. The binder fibers, when melted, can tack along the outsides of the one or more other fibers, and upon hardening produce the nonwoven structure as a mass of the one or more other fibers with adjacent fibers held together at various locations by binder material resulting melting and re-hardening of the binder fibers. These nonwovens are therefore also referred to as "thermobonded nonwovens."

Forming an HE-NWM mold blank 302 can include compressing the nonwoven material, while heating to a melt temperature of the binder material and can further include maintaining the compression until cooling re-solidifies the binder. The compression state of the NWM fibers held by the solidified binder effectively stores kinetic energy, because the compressed fiber orientation is not the fiber's natural orientation. It will therefore be understood that, for the blanks to store kinetic energy of compression, their dimension, i.e., the compressed dimension maintained by the solidified binder, must be less than the original dimension of the nonwoven (be it height, width, or length).

Vertically lapped ("V-lap") nonwoven material may be preferable for some applications, e.g., for seating or bedding components, "vertical" being in a direction that opposes the weight of a person's back or buttocks, as it has more stiffness and resilience in the vertical direction. A blank formed of V-lap nonwoven can be compressed 50%, 60%, 70%, 80%, 90%, from its original height, and, on subsequent heating, may expand up to, or beyond its original height.

Preferably, thermobonded nonwovens for practices according to disclosed embodiments have at least 5% by weight binder material, with up to 95% by weight of the one or more other fibers. Percentages can depend on application-specific requirements. Also, for some applications, the thermobonded nonwoven may include additional materials, e.g., fire retardant ("FR") compounds, scented compounds, anti-microbial compounds or materials, polymeric coatings, and metal or ceramic particles.

Example ratios of binder material to the one or more other fiber in the nonwovens used for practices in accordance with disclosed embodiments may range from 5:95 to 95:5.

Examples of thermobonded nonwovens which may be used in practices according to disclosed embodiments can include, but are not limited, any thermobond made with any of the example combinations of materials and corresponding percentages thereof listed in Table 1:

TABLE 1 up to 95% of any denier, any fiber length, polyester fiber, e.g., not limited to PET (polyethylene terephthalate), PTT (polytrimethylene terephthalate), and PBT (polybuthylene terephthalate)
up to 95% of any denier, any fiber length, polyacrylonitrile fiber
up to 95% of any denier, any fiber length, polyvinyl alcohol fiber (PVA)
up to 95% of any denier, any fiber length, polytetrafluoroethylene fiber (PTFE), e.g., TEFLON
up to 95% of any denier, any fiber length, polyamide fiber, e.g., nylon or perlon
up to 95% of any denier, any fiber length, wool fiber;
up to 95% of any denier, any fiber length, coconut fiber;
up to 95% of any denier, any fiber length, hemp fiber;
up to 95% of any denier, any fiber length, flax fiber;
up to 95% of any denier, any fiber length, jute fiber;
up to 95% of any denier, any fiber length, cotton fiber;
up to 95% of any denier, any fiber length, viscose fiber, e.g., rayon;
up to 95% of any denier, any fiber length, polyethylene fiber;
up to 95% of any denier, any fiber length, polypropylene fiber;
up to 95% of any denier, any fiber length, polyester fiber, e.g., not limited to PET (polyethylene terephthalate), PTT (polytrimethylene terephthalate), TABLE 1-continued and PBT (polybuthylene terephthalate)
up to 95% of any denier, any fiber length, Basofil fiber
up to 95% of any denier, any fiber length, Belcotex fiber;
up to 95% of any denier, any fiber length, Nomex fiber;
up to 95% of any denier, any fiber length, O-PAN fiber;
up to 95% of any denier, any fiber length, Tencel fiber;
up to 95% of a mixture of any of the fibers set forth above or any mixture of fibers with other fibers of interest (e.g. silver fibers for providing antimicrobial resistance, basalt fibers, natural fibers (e.g., cotton, ramie, coir, hemp, abaca, sisal, kapok, jute, flax, linen, kenaf, coconut fiber, pineapple fiber, wool, cashmere, and silk), man-made fibers (e.g., polyester, nylon, acrylics, acetate, polyolefins, melamine fibers, elastomeric fibers, polybenzimidazole, aramid fibers, polyimide fibers, modacrylics, polyphenylene sulfide fibers, oxidized PAN fiber, carbon fibers, novoloid fibers, manufactured cellulosic fibers (e.g., rayon, lyocell, bamboo fiber, Tencel, and Modal), and manufactured fire-retardant (FR) cellulosic fibers (e.g., Visil.RTM., Anti-Fcell, Daiwabo's Corona. fibers, Anti-Frayon, Sniace's FR rayon, and Lenzing FR)).

Examples of thermobonded nonwovens that may be used in practices according to disclosed embodiments can also include, but are not limited, any thermobond made with any hollow core fibers, e.g., hollow core polyethylene terephthalate (PET).

Examples of thermobonded nonwovens that may be used in practices according to disclosed embodiments can also include, but are not limited, any thermobonded nonwoven made with composite fibers, sometimes referred to as sheath-core fibers.

Binder fibers used to produce nonwovens that may be used in practices according to disclosed embodiments can also include sheath-core fibers, where the sheath is polyester or some other low melting temperature material.

Examples of nonwovens not preferable for practice of the invention include: any thermobonded nonwoven made with a fiber that melts at an equal or lower temperature than the binder fiber's melt temperature; and any thermobonded nonwoven made with only binder.

Optionally, in practices according to one or more disclosed embodiments, blanks can be laminated to form boards. Lamination can be blanks to blanks or can be a lamination of blanks with non-expandable materials such as foams, fabric (e.g., knitted material), rubber, metal, metal alloy, polymeric, ceramic, and paper materials. The boards may also be cut to desired sizes and shapes, e.g., using a suitable computer controlled or manual cutting machine.

A "nonwoven" is a manufactured sheet, web, or batt of natural and/or man-made fibers or filaments that are bonded to each other by any of several means. Manufacturing of nonwoven products is well described in "Nonwoven Textile Fabrics" in Kirk-Othmer Encyclopedia of Chemical Technology, 3rd Ed., Vol. 16, July 1984, John Wiley & Sons, p. 72-124 and in "Nonwoven Textiles", November 1988, Carolina Academic Press. Nonwovens are commercially available from a number of manufacturers.

For some applications, board/blanks made of vertically lapped ("V-Lap") configuration NWM may provide some advantages in terms of support or comfort, where "vertical" means a direction that opposes, for example, the weight of a person's back or buttocks. V-lap nonwoven blanks or boards can be compressed 50%, 60%, 70%, 80%, 90%, etc. from their original height dimension, and, on subsequent heating, can expand toward, up to, or beyond the original height dimension. Vertical lapping may be performed using methods as set forth in US 2008/0155787 and U.S. Pat. No. 7,591,049, each of which is incorporated herein by reference. Vertically lapped nonwovens are commercially available from various commercial vendors.

Nonwovens in the practices according to disclosed embodiments can be fabricated from a mass of fibers, which can comprise binder fibers and one or more other fibers. The binder fibers have a melting temperature that is below the melting or decomposition temperature of the one or more other fibers, e.g., binder fibers typically have a melting temperature of 80-150° C. (polyesters are typical examples of binder fibers used in the production of nonwovens (examples of elastic polyester binder fibers include ELK®, E-PLEX®, and EMF type high elastic LMF are commercially available from Teijin Limited, Toray Chemical Korea Inc., and Huvis Corporation, respectively)). Once the binder fibers are melted, they will generally tack along the outsides of the one or more other fibers. On cooling the will harden to produce the nonwoven which is essentially a mass of the one or more other fibers with adjacent fibers held together at various locations throughout the nonwoven by binder material which results from melting and re-hardening of the binder fibers. These nonwovens are often referred to as thermobonded nonwovens. The thermobonded nonwovens in the practice of this invention will have at least 5% by weight binder material, with up to 95% by weight of the one or more other fibers. Depending on the needs of the article manufacturer the binder material may constitute 5-50% by weight of the nonwoven with the remainder being the one or more other fibers, or the one more other fibers plus additional materials. Additional materials can include but are not limited to fire retardant compounds scented compounds, antimicrobial compounds or materials (e.g., silver particles or fibers), polymeric coatings, metal or ceramic particles; etc. Examples of FR chemicals/compounds include, but are not limited to, phosphoric acid and its derivatives, phosphonic acid and its derivatives, sulfuric acid and its derivatives, sulfamic acid and its derivatives, boric acid, ammonium phosphates, ammonium polyphosphates, ammonium sulfate, ammonium sulfamate, ammonium chloride, ammonium bromide.)

Depending on the application, the ratio of binder material to the one or more other fibers in the nonwovens for practices in accordance with disclosed embodiments may range from 5:95 to 95:5.

Hollow core fibers, e.g., hollow core polyethylene terephthalate (PET) may be used in practices according to disclosed embodiments. In addition, nonwovens that can be used useful in the practices according to disclosed embodiments can be formed using composite fibers, which can be referred to as sheath-core fibers. Binder fibers used in producing nonwovens that can be used in practices according to various embodiments can include sheath-core fibers, where the sheath is polyester or some other low melting temperature material.

FIG. 3, as described above, shows a front crosscut view, on the FIG. 2A cross-cut projection 2B-2B, of the example separable mold 102, with an example compressed, HE-NWM molding blank 302, formed as described above, in the mold interior.

Figure 4:
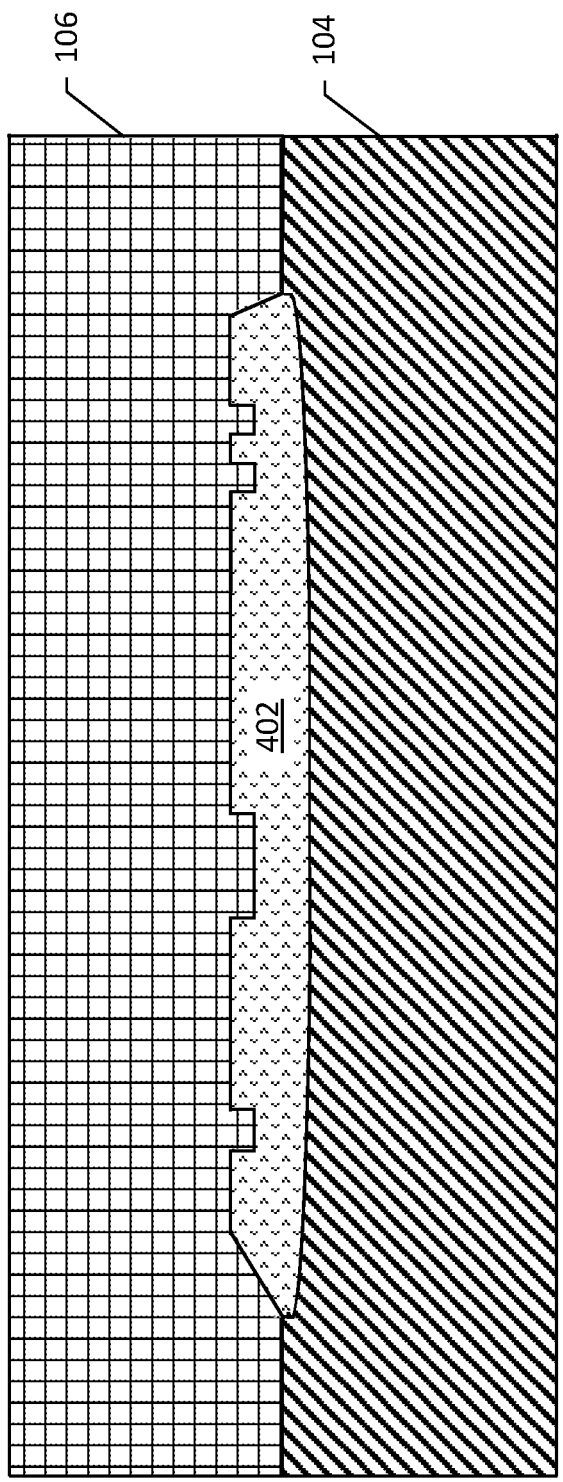
FIG. 4 shows a front crosscut view, on the cross-cut projection of FIG. 3, of an intermediate NWM 3D object, produced by a first stage HE-NWM molding processing of the compressed, HE-NWM molding blank.

FIG. 4 shows a front crosscut view, on the cross-cut projection of FIG. 3, of an intermediate NWM molded 3D object 402, produced by a first stage HE-NWM molding processing of the compressed, HE-NWM molding blank 302.

Figure 5:
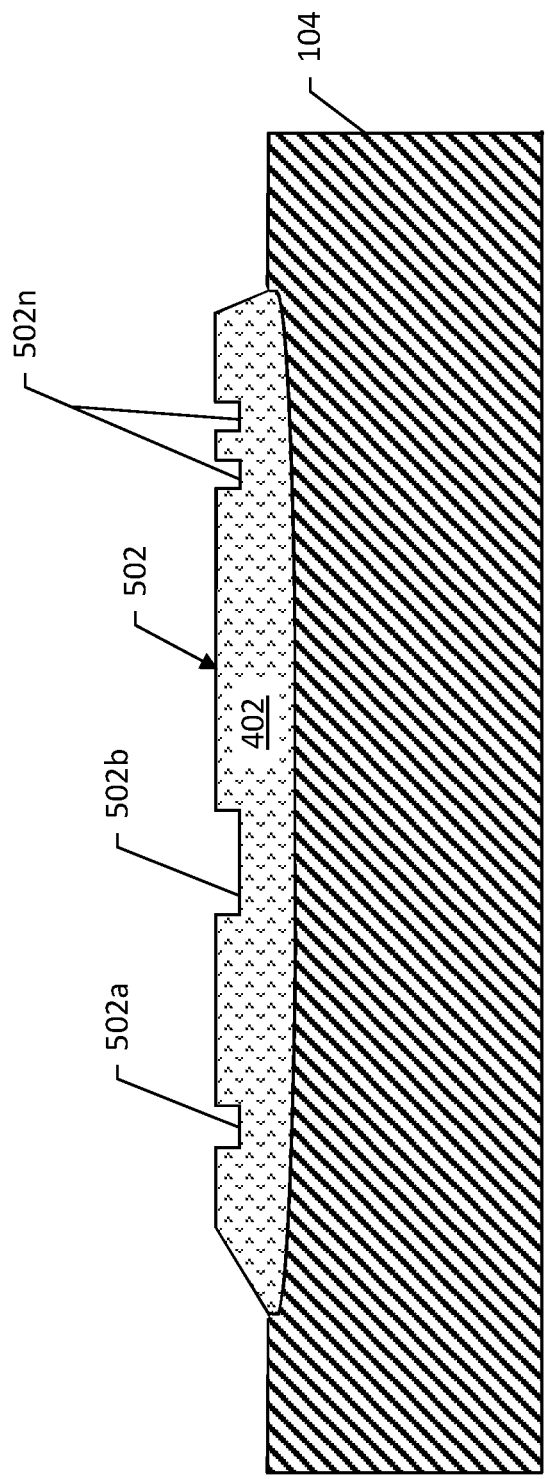
FIG. 5 shows a front crosscut view, on the cross-cut projection of FIGS. 3 and 4, showing the exposed upper surface of the intermediate NWM 3D molded object after removing the mold upper component.

FIG. 5 shows a front crosscut view, on the cross-cut projection of FIGS. 3 and 4, showing the exposed upper surface 502 of the intermediate NWM 3D molded object after removing the mold upper component 106. The upper surface 502 is shown with an intermediate object first top surface contour 502a, corresponding to the first top surface molding feature 206a of the FIGS. 2A and 2B example contoured top molding surface 206, and an intermediate object second top surface contour 502b and nth top surface contour 502n corresponding, respectively, to the FIG. 2A-2B second top surface molding feature 206b and nth top surface molding feature 206n.

Figure 6:
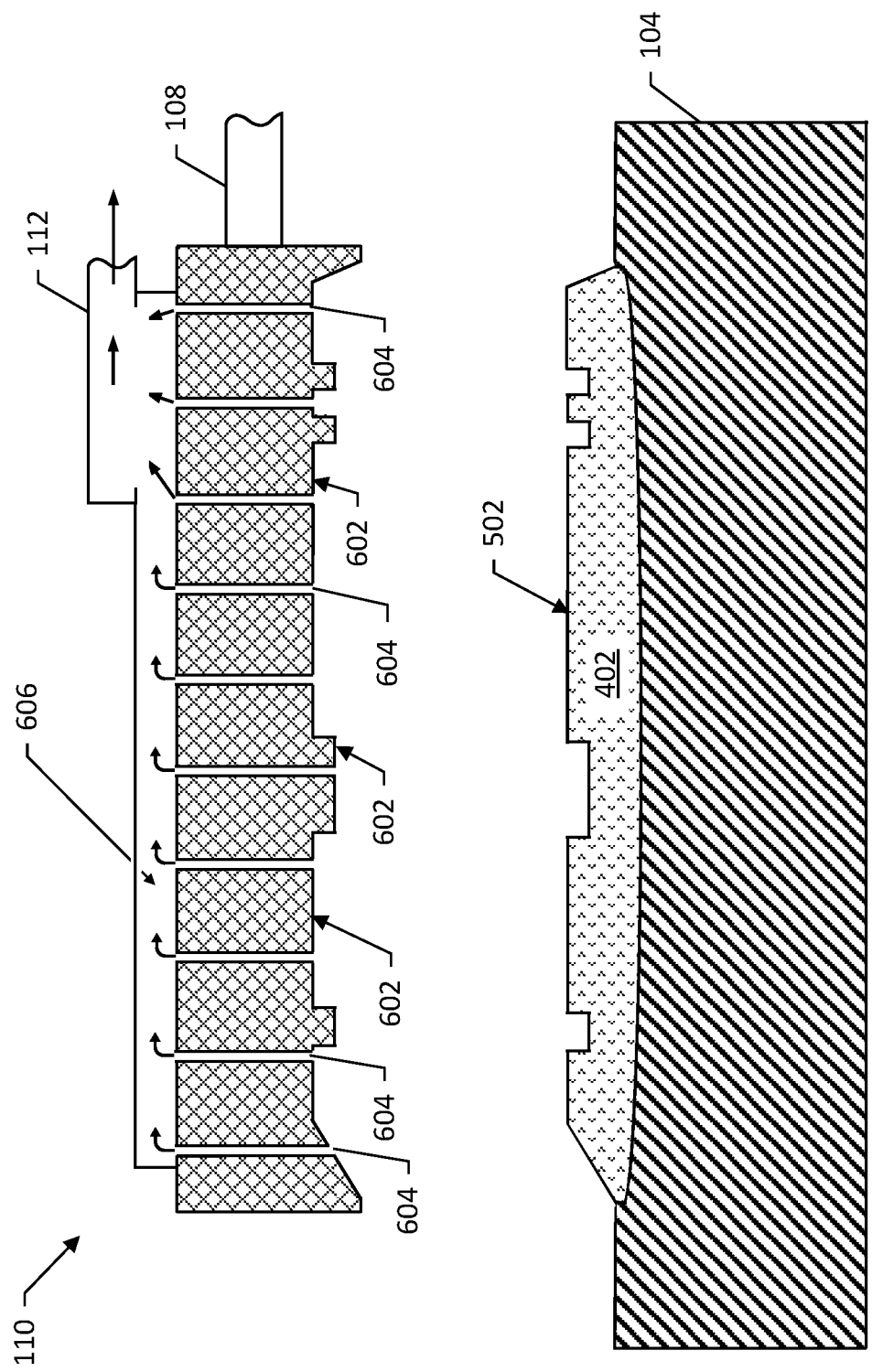
FIG. 6 shows a front crosscut view of an example effector according to an exemplary embodiment, providing a contact surface configured for the top surface of the first stage NWM 3D object, positioned above the intermediate NWM 3D molded object by the FIG. 1 actuatable arm.

FIG. 6 shows a front crosscut view of an example implementation of the end effector 110 according to an exemplary embodiment. The FIG. 6 end effector provides a contact surface 602 configured for the top or upper surface 502 of the intermediate NWM molded 3D object 402, positioned above the intermediate NWM 3D molded object by actuation of the FIG. 1 actuatable arm 108. According to various embodiments, the contact surface 602 can be configured with various contours, such as the examples (visible but not separately labeled) shown in FIG. 6 as corresponding, respectively, to the intermediate object first top surface contour 502a, second top surface contour 502b, and nth top surface contour 502n. Accordingly, the contact surface 602 is also referenced herein as the "contoured contact surface" 602.

In an aspect, contour features of the contoured contact surface 602 can be identical, respectively, to the top molding surface features of the upper component 106 of the separable mold 102. FIG. 6 can be an example of such configuration, intermediate object first top surface contour 502a, second top surface contour 502b, and nth top surface contour 502n being identical, respectively, to the first top surface molding feature 206a, second top surface molding feature 206b, and nth top surface molding feature 206n of the FIG. 2A-2B contoured top molding surface 206. Such configuration can provide, concurrent with second form augmenting and finishing operations on the bottom surface of the intermediate NWM molded 3D object 402, as described below, a finishing and fixing of the upper contour of the final NWM product to match the original contoured top molding surface 206. Benefits and advantages of such configuration can include, without limitation, a solution to unwanted post-molding expansion that can occur when removing molded NWM 3D objects from their heat expansion molds prior to fully cooling to the NWM binder solidification temperature.

In another aspect, the contact contour features of the contact surface 602, or some of such features, can be additional to, or can augment or otherwise differ from the FIG. 2A-2B contoured top molding surface 206.

Referring to FIG. 6, the example end effector 110 includes a plurality of vacuum passages 604, each establishing a fluid connection from an opening at the contact surface 602 and a vacuum plenum 606. It will be understood that vacuum passages 604 are only an example of distribution conduits for the vacuum. Alternative implementations include, but are not limited to, tubular structures. For purposes of illustration, FIG. 6 shows the vacuum activated, by representative flow arrows.

Figure 7:
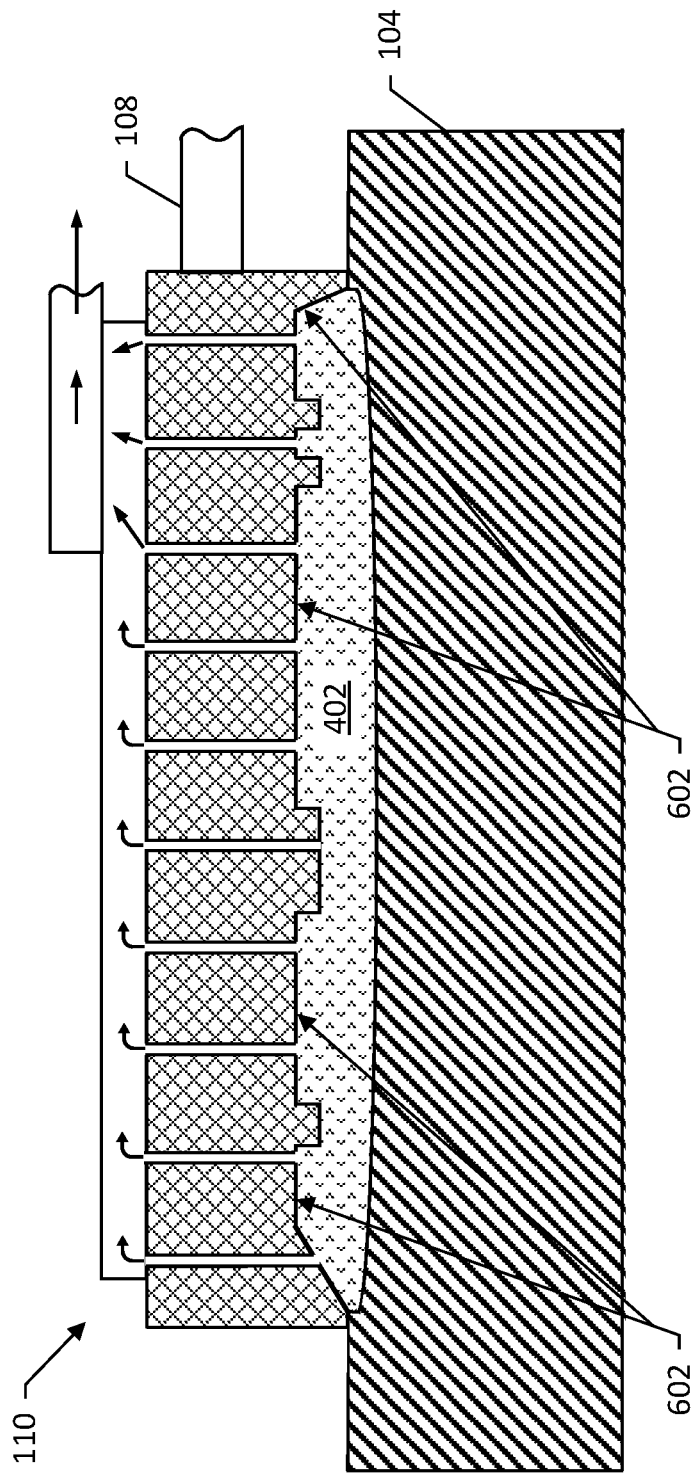
FIG. 7 shows a front crosscut view of the FIG. 6 example end effector, with the contact surface against the upper surface of the intermediate NWM 3D molded object, and the vacuum suction activated, for transportation further to second stage augmentation and finishing according to one or more embodiments.

FIG. 7 shows a front crosscut view of the FIG. 6 example end effector 110, with the contact surface 602 against the upper surface 502 of the intermediate NWM 3D molded object 402, and the vacuum suction activated, for transportation further to second stage augmentation and finishing according to one or more embodiments.

Figure 8:
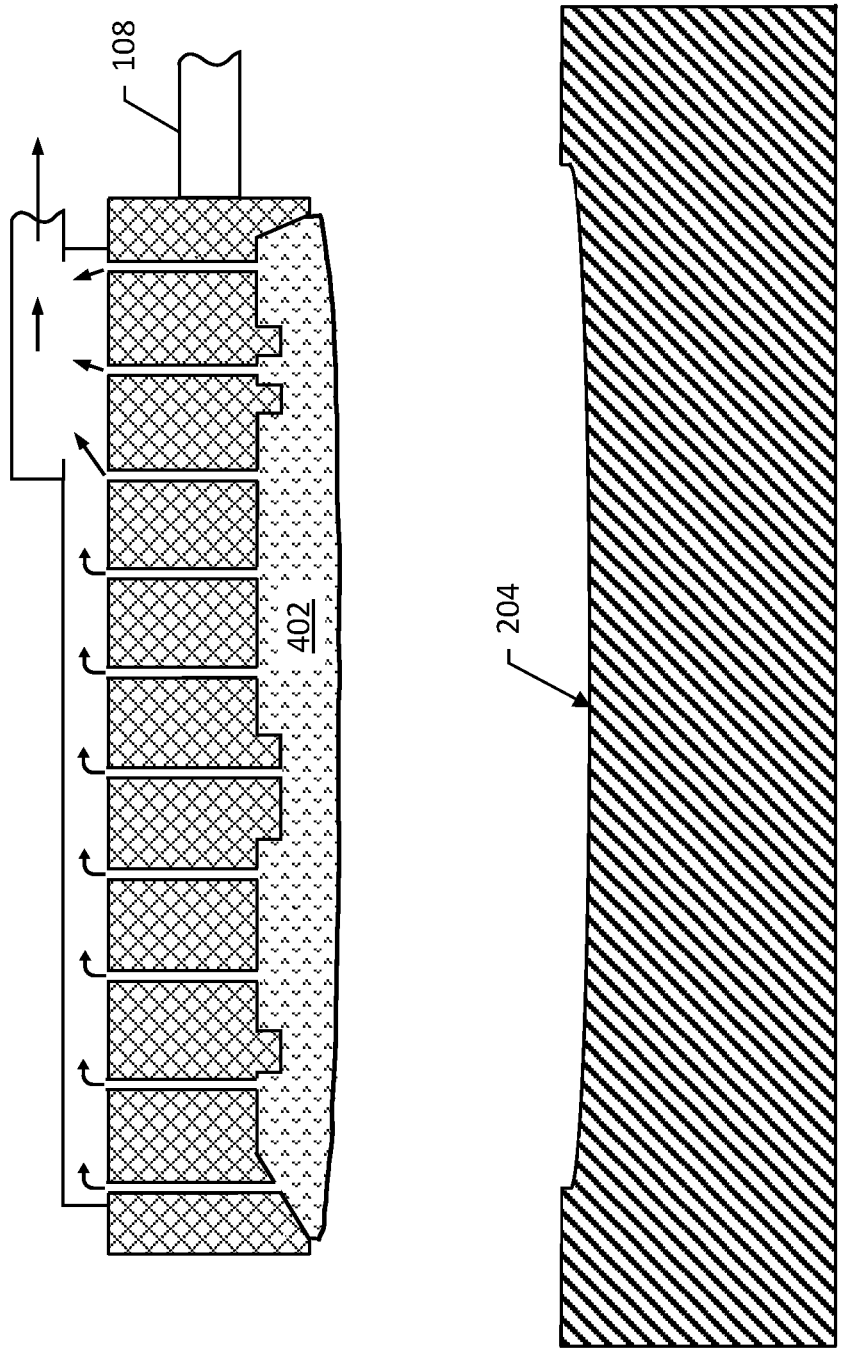
FIG. 8 shows a front crosscut view of the FIG. 7 end effector, with the contact surface against the upper surface of the intermediate NWM 3D molded object, after lifting the first stage NWM 3D molded object from the lower part of the separable mold.

FIG. 8 shows, viewed on the same front crosscut projection as FIG. 7, end effector 110, with the contact surface 602 against the upper surface 502 of the intermediate NWM 3D molded object 402, after lifting said object 402 from the lower component 104 of the separable mold 102. The position visible in FIG. 8 is a snapshot in a movement sequence or trajectory performed by the actuatable arm 108, e.g., under control of a controller as described above, in transporting the intermediate NWM 3D molded object 402 from the lower component 104 of the now separated mold 102 over to the FIG. 1 second stage forming base 114, for second stage augmentation and finishing according to one or more embodiments.

Figure 9:
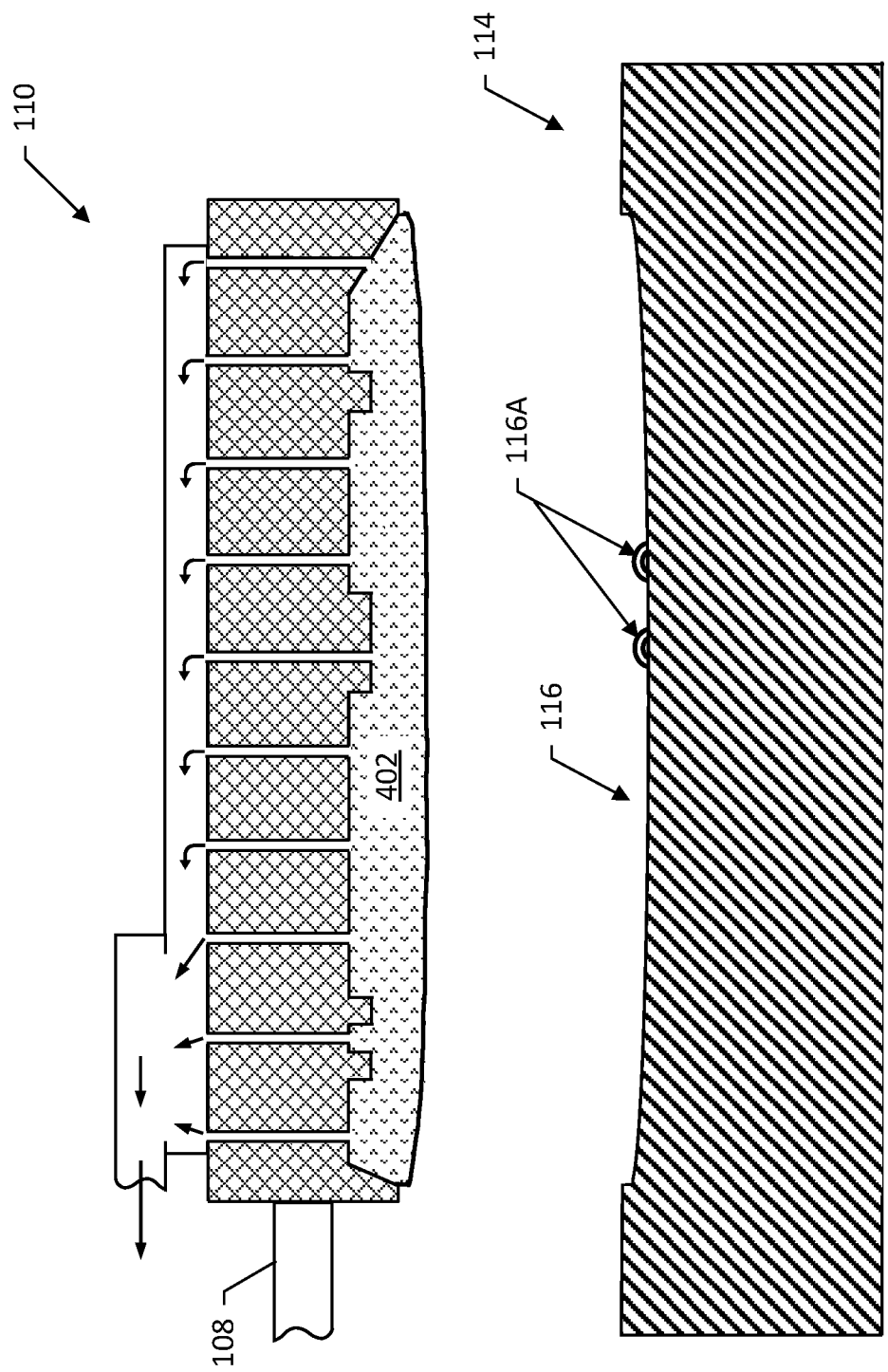
FIG. 9 shows a front crosscut view of the FIG. 7 end effector, having transported the first stage NWM 3D molded object and positioned it above an example finishing form surface of an example second stage forming base, with an example finishing feature contour, for a second stage form augmenting and finishing according to one or more embodiments.

FIG. 9 shows a front crosscut view of the FIG. 7 end effector 110, having transported the first stage NWM 3D molded object and positioned it above an example of the FIG. 1 finishing form surface 116 and finishing contour feature 116A of the second stage forming base 114. To illustrate various features of second stage augmentation and finishing according to various embodiments, the FIG. 9 viewing projection, for the second stage forming base 114, its finishing form surface 116, and the finishing contour feature 116A, is the FIG. 1 cross-sectional projection 9-9. Operations in second stage augmentation and finishing processes according to disclosed embodiments can include the actuatable arm 108 lowering the end effector 110 to compress the lower surface of the gripped intermediate NWM 3D molded object 402 on the finishing form surface 116 and its example finishing contour feature 116A. Although not explicitly visible, and dependent in part on the specific configuration of the contoured contact surface 602, the compressing can also supplement or augment features of the upper surface 502 of the intermediate NWM 3D molded object 402, as described above.

Figure 10:
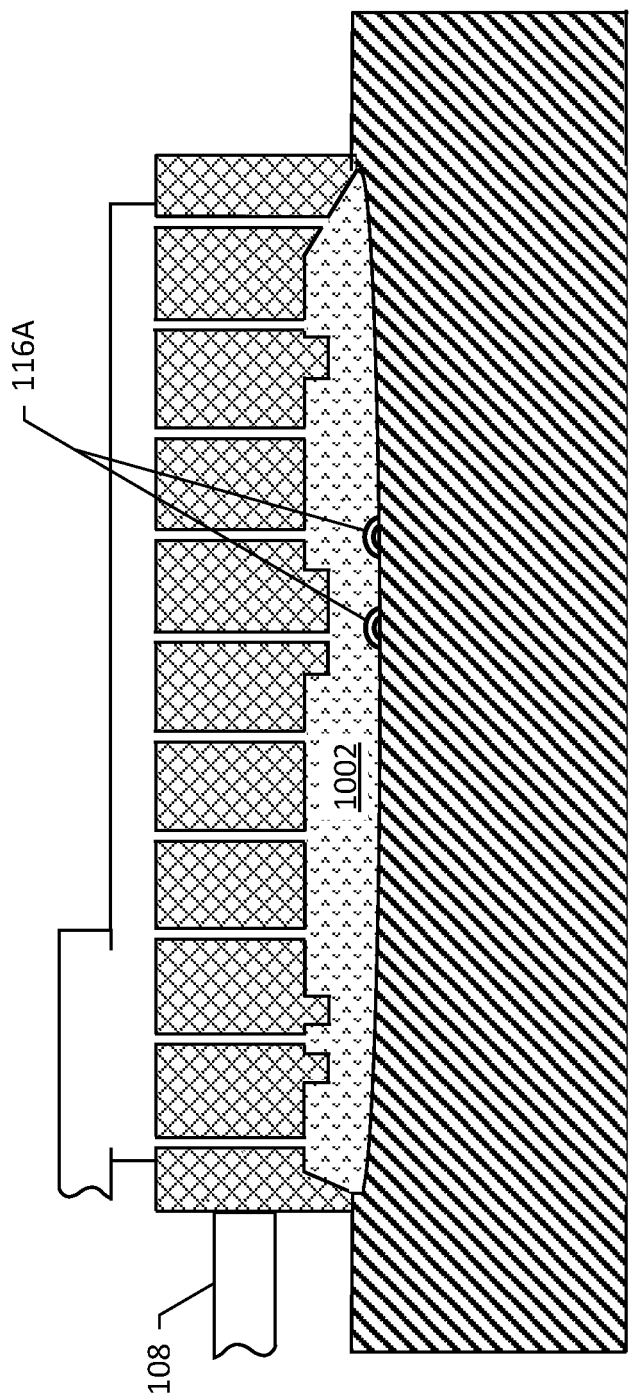
FIG. 10 shows a front crosscut view of the FIG. 8 end effector, after aligning the first stage NWM 3D molded object above the FIG. 9 second stage forming base, urging the intermediate NWM 3D molded object onto the finishing form surface and its example finishing feature forming contour, for a second stage form augmenting and finishing according to one or more embodiments.

FIG. 10 shows, on the same front crosscut projection as FIG. 8, the end effector 110, after aligning the first stage NWM 3D molded object 402 above the FIG. 9 second stage forming base 114, urging the intermediate NWM 3D molded object onto the finishing form surface 116 and its example finishing feature forming contour 116A, for a second stage form augmenting and finishing according to one or more embodiments.

FIG. 11 shows a front crosscut view of an example finished NWM 3D molded object 1100 after the FIG. 10 illustrated second stage augmentation and finishing cools the finished NWM 3D molded object below the binder solidification temperature, fixing the 3D molded object's form and dimensions, and the actuatable arm 108 has removed the end effector 110.

FIGS. 12A and 12B show a first rotation and a second rotation view of a finished NWM 3D molded object 1100 produced by the described example two-stage HE-NWM molding process according to one or more embodiments.

Figure 13:
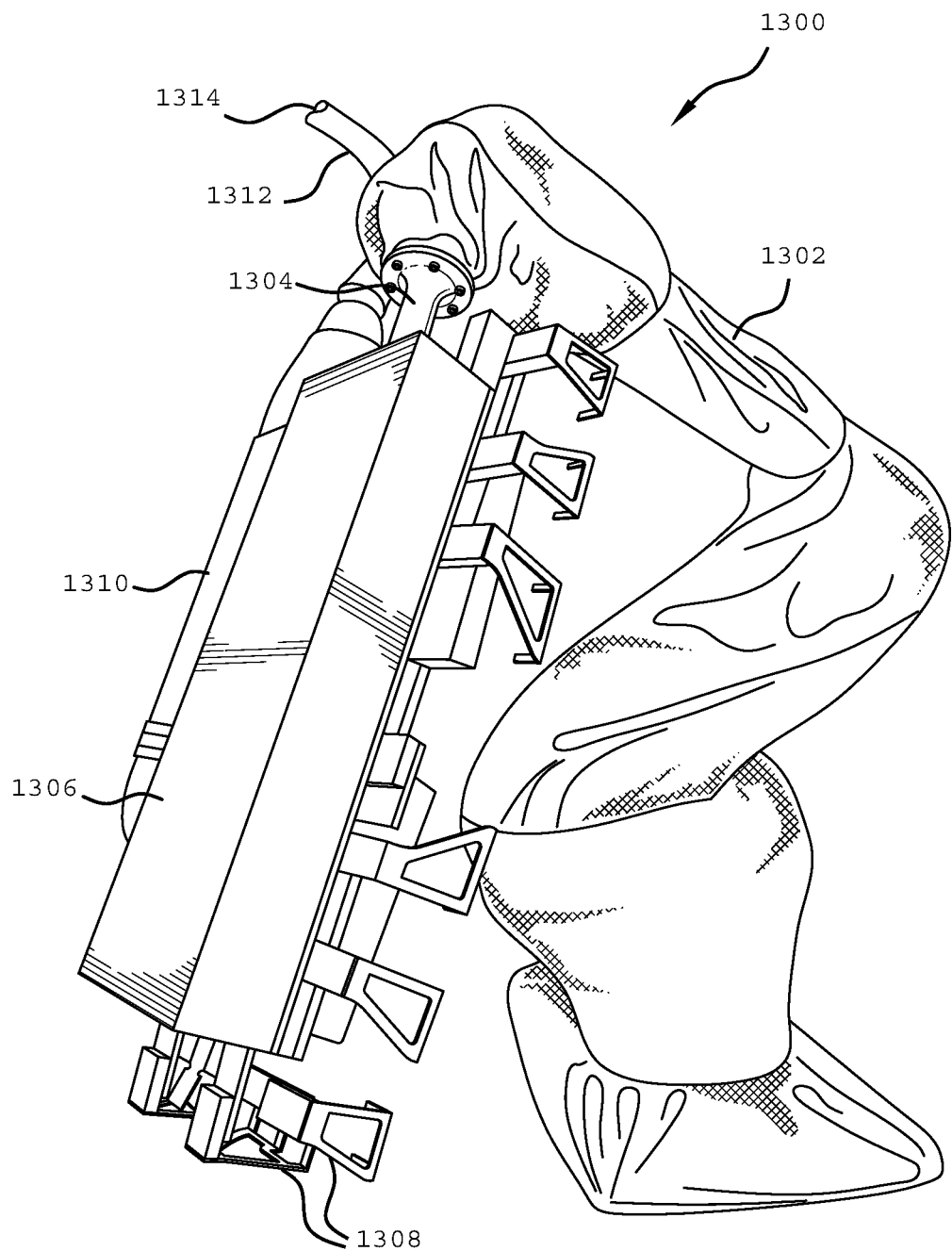
FIG. 13 shows a top isometric view of an example end effector, connected to an actuatable arm, for a first stage NWM object removal, transport, and second stage form augmenting and finishing operations in exemplary two-stage NWM 3D molding processes in accordance with various embodiments.

FIG. 13 shows a top isometric view of an example end effector 1300, connected to an actuatable arm 1302, for a first stage NWM object removal, transport, and second stage form augmenting and finishing operations in exemplary two-stage NWM 3D molding processes in accordance with various embodiments. The end effector 1300 includes a rotatable mechanical connection 1304 to the actuatable arm 1302, and a vacuum plenum or distribution chamber 1306 that receives, via a side vacuum distribution channel 1310, a vacuum 1314 through a vacuum connection hose 1312. The end effector also includes connectors or attachment clamps 1308 for attaching and securing, for example, to a lower component of a mold.

Figure 14:
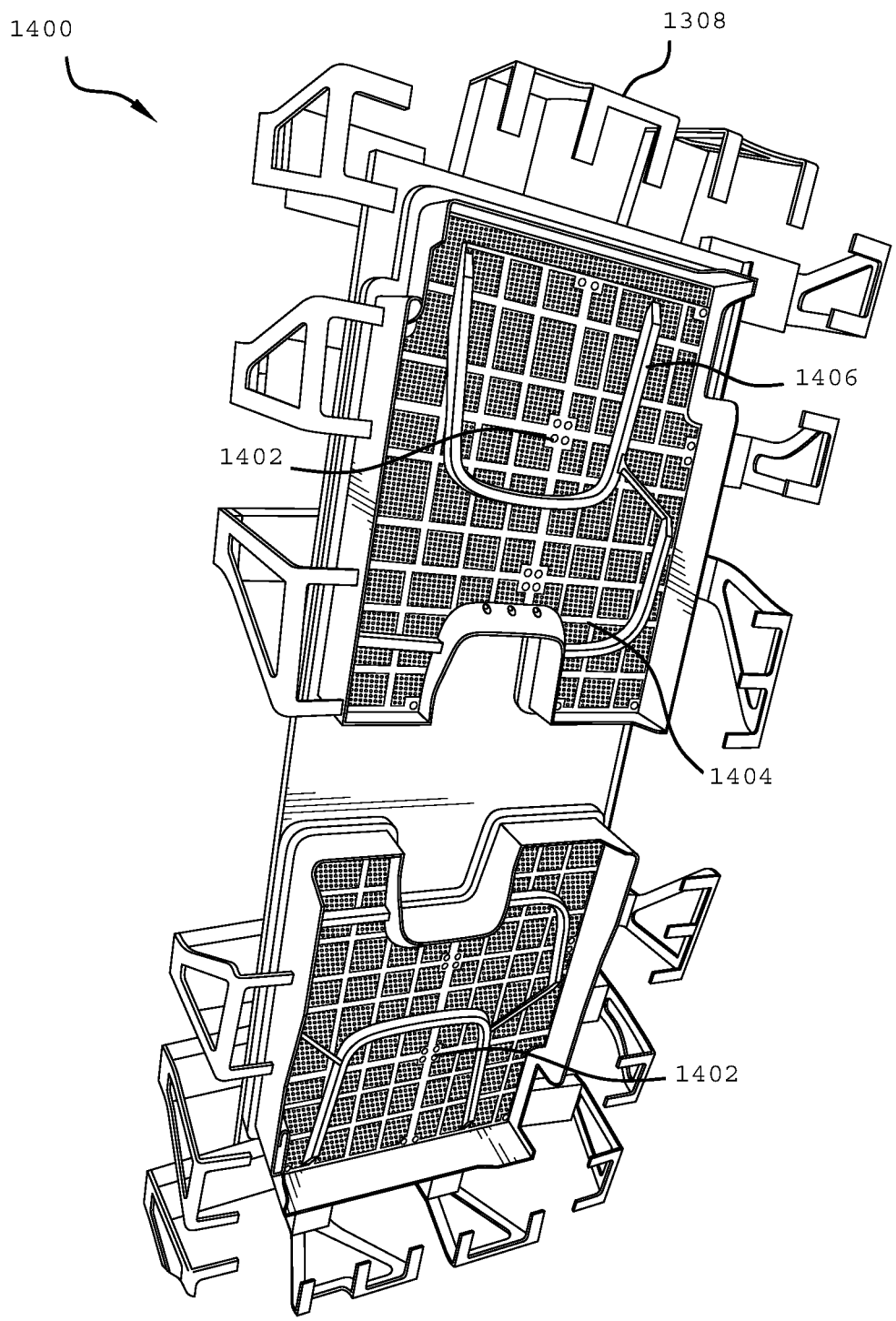
FIG. 14 shows another isometric view of the example contoured contact surface of the FIG. 13 end effector in accordance with various embodiments.

FIG. 14 shows an isometric view of an example contoured contact surface 1400 of the FIG. 13 end effector 1300, in accordance with various embodiments, viewed by rotating the FIG. 13 view about the axis of the rotatable mechanical connection 1304. The contoured contact surface 1400 includes a first instance of a first contour embossment feature 1402 at a first region and a second instance of the first contour embossment feature 1402 at a second region. The contoured contact surface 1400 also includes, in the first region, an instance of a second contour embossment feature 1404 in the first region, and an instance of a first recessing contour feature 1406.

Figure 15:
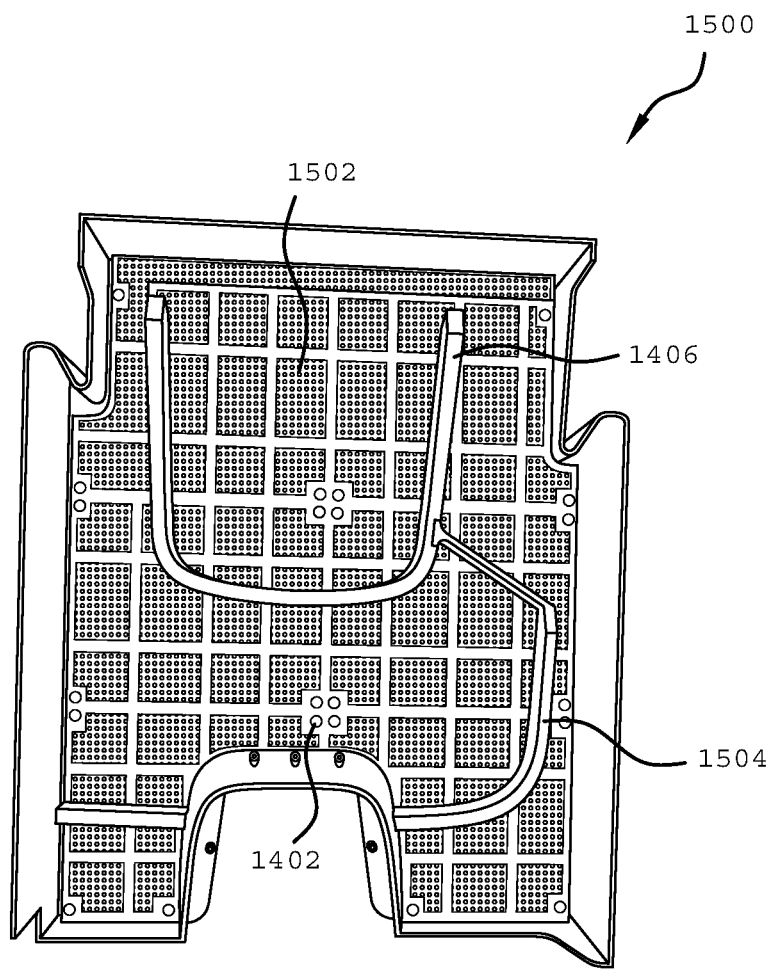
FIG. 15 is a plan view of the FIG. 14 example contoured contact surface of the end effector.

FIG. 15 is a plan view 1500 of the first region of the FIG. 14 example contoured contact surface 1400 of the end effector. As shown, the first region of also includes a texture feature 1502, and a second recessing contour feature 1504.

Figure 16:
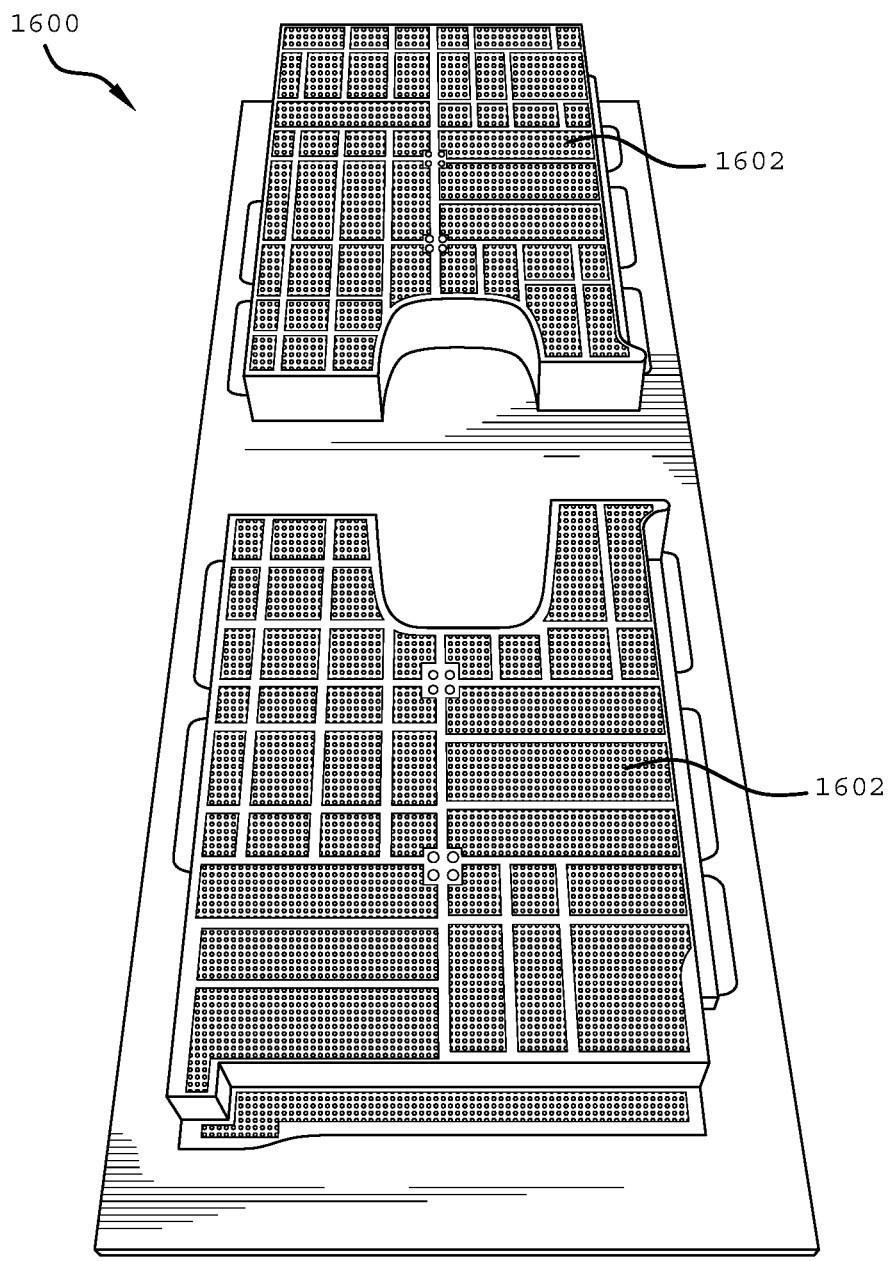
FIG. 16 shows an isometric view of another example finishing feature forming contour, for another example second stage forming base, for other second stage form augmenting and finishing in two-stage NWM 3D molding processes according to various embodiments.

FIG. 16 shows an isometric view of an example finishing forming contour 1600, for a second stage forming base, for second stage form augmenting and finishing in two-stage NWM 3D molding processes according to various embodiments. The finishing forming contour 1600 can be an implementation, for example, of the FIG. 1 final forming surface 116. The finishing forming contour 1600 includes finish features 1602.

Figure 17:
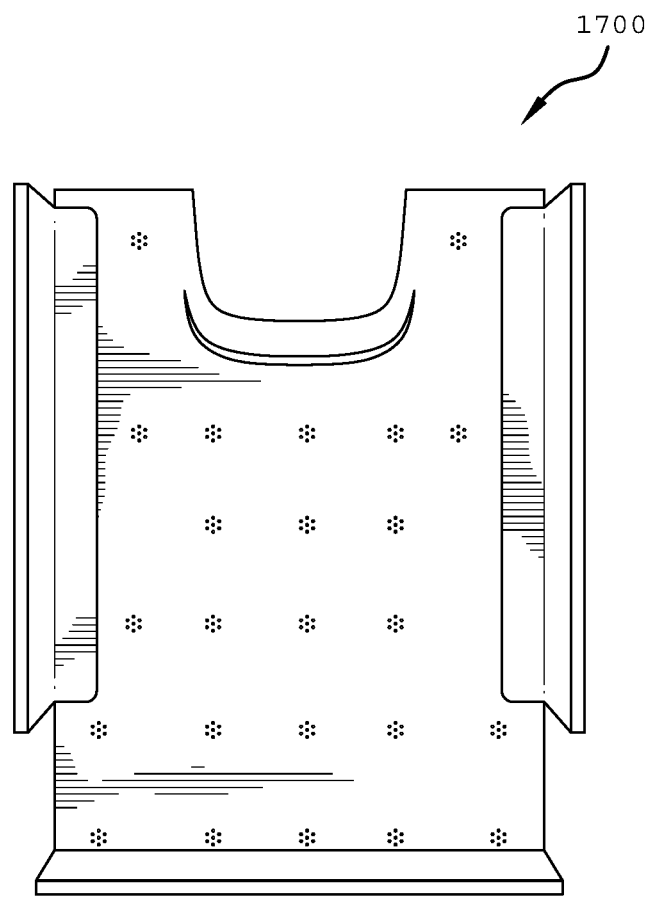
FIG. 17 shows a first projection view of another example finished NWM 3D molded object, as can be produced by a two-stage HE-NWM molding process according to various embodiments, using the example end effector illustrated in FIGS. 13-15, and finishing form contour illustrated in FIG. 16.

FIG. 17 shows a first projection view of example finished NWM 3D molded object 1700, as can be produced by a two-stage HE-NWM molding process according to various embodiments, using the example end effector illustrated in FIGS. 13-15, and finishing form contour illustrated in FIG. 16.

Figure 18:
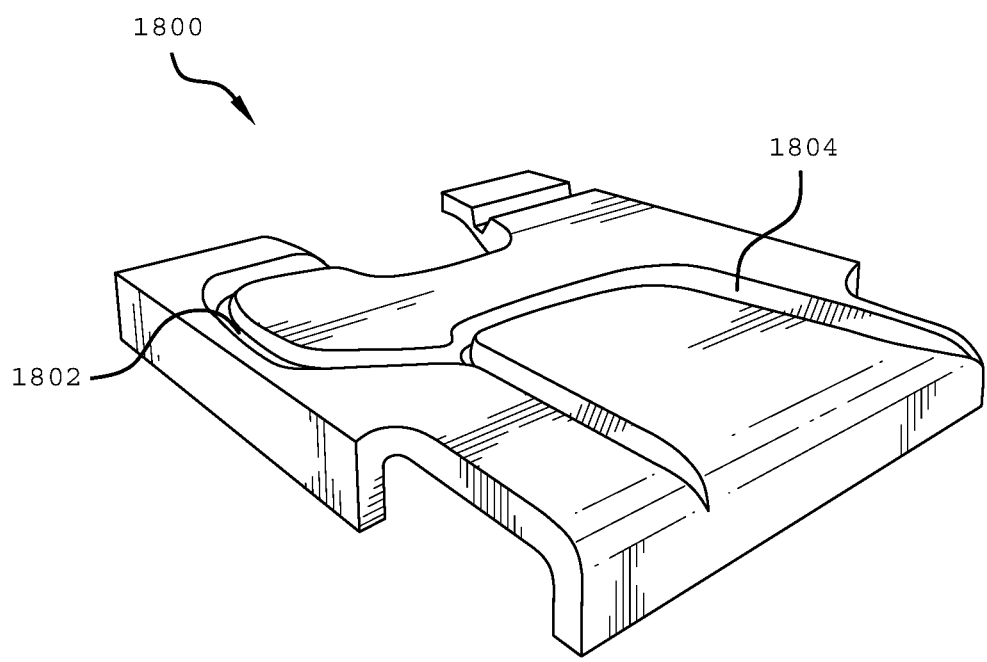
FIG. 18 is an isometric view of the finished NWM 3D molded object shown in FIG. 17, from a perspective showing a reverse side.

FIG. 18 is an isometric view of the finished NWM 3D molded object 1700 shown in FIG. 17, showing a finish form 1800 from a reverse side. The finish form 1800 includes a first recess 1802 and a second recess 1804. The first recess 1802 corresponds to the FIG. 15 second recessing contour feature 1504, and the second recess 1804 corresponds to the FIG. 14 first recessing contour feature 1406.

Figure 19:
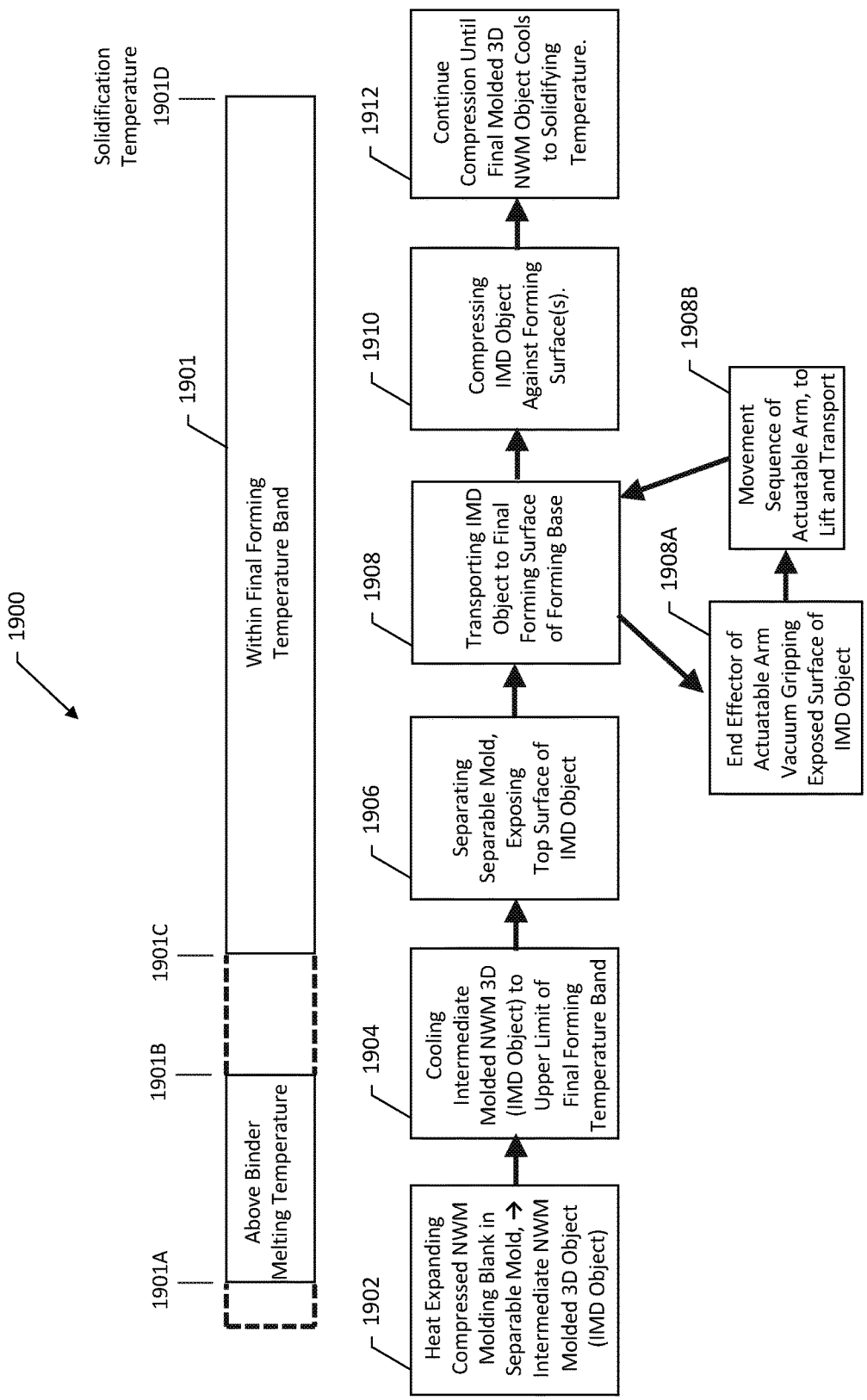
FIG. 19 shows a flow diagram of operations in an example process in a two-stage HE-NWM molding process according to various embodiments.

FIG. 19 shows a flow diagram of operations in an example process 1900 in a two-stage HE-NWM molding process according to various embodiments. For brevity of labelling blocks, FIG. 19 abbreviates "intermediate NWM molded 3D object" as "IMD Object."

FIG. 19 includes, arranged above the process 1900 blocks, a temperature state progression 1901, which is referenced in the following description of example operations in an instance of the process 1900. An example instance can include heat expanding 1902 a compressed NWM molding blank within a separable mold, producing an intermediate NWM molded 3D object. Referring for purposes of example, to FIGS. 3 through 12b, example implementations of heat expanding 1902 can include, but are not limited to, placing as shown in FIG. 3 a compressed HE NWM molding blank 302 in an interior of a separable mold such as the separable mold 102, then heating the compressed HE NWM molding blank 302, for example and without limitation, via routing steam through one or both of the upper component 106 and lower component 104 of the separable mold 102. As illustrated by reference point 1901A of the temperature state progression 1901, in an aspect, the heat expanding 1902 raises the temperature of the compressed NWM molding blank 302 to a value higher than the melting temperature of the binder material of the compressed NWM molding blank.

Upon completion of the heat expanding 1902 operations in the process 1900 can proceed to cooling 1904 the IMD object to the upper boundary of the final forming temperature band. As described above, the upper boundary is lower than the melting temperature of the NWM binder material but higher than the binder solidification temperature. FIG. 19 shows the temperature at commencement of the cooling as 1901B, and the upper boundary of the final forming temperature band as 1902C. Upon the temperature of the IMD object descending to the upper boundary 1901C, operations in the process 1900 proceed to separating 1906 the separable mold, exposing an upper or top surface of the IMD object. It will be understood that "upper" and "top," in the context of the exposed surface of the IMD object, is in reference to the lower component 104 and upper component 106 of the FIG. 1 example separable mold 102. In some application, the exposed upper surface of the IMD object may be the bottom, or even a side surface of the final NWM molded object.

Depending on the specific setting of the upper boundary 1901C, and specific NWM, there may be an undesirable degradation from separating 1906 prior to the IMD object cooling to, or sufficiently close to the upper boundary 1901C of the temperature state progression 1901. The cooling rate can be increased, for example, by air flow. Optionally, cooling rate can be increased using a cycling of vacuum removal of steam condensation, re-pressurization, vacuum removal, and so forth, as described in the '837 publication.

Upon separating 1906 the mold, operations in the process 1900 can proceed to transporting 1908 the IMD object to a final forming surface of a forming base. As shown on FIG. 19, operations in the transporting 1908 can include the end effector of the actuating arm performing vacuum gripping 1908A of the upper surface, then performing sequential transporting movements 1908B lifting the IMD object from the separated mold, and positioning the IMD object over the final forming surface. Examples of these operations can be the FIG. 1 actuatable arm 108 positioning the contact surface 111 of the end effector 110 onto the exposed surface of the IMD object, such as shown in FIG. 6, where the contact surface 602 of the end effector 110 is above the exposed top surface 502 of the example IMD object 402. Then, as shown in FIG. 7, the vacuum suction can be activated, gripping the IMD object 402 sufficiently to withstand the weight of the IMD object and, initially, and any adhesion of the object's bottom surface to the bottom surface 204 (labeled on FIG. 2B) of the lower component 104 of the mold. Referring to FIG. 8, example operations implementing the transporting operations 1908B can then lift the IMD object 402 from the surface 204 of the lower component 104 and, by various rotations of the actuatable arm segments (visible in FIG. 1 but not separately numbered) about their pivot axes, transporting the IMD object to the position illustrated on FIG. 9. The position, as shown on FIG. 9, is above the final forming surface 116 with its example final forming features 116A.

Operations in the process 1900 can then proceed to compressing 1910 portions of the IMD object objects against one or more final forming surfaces, or between two or more final forming surfaces, or both. As shown on FIG. 19, the compressing 1910 is initiated while the IMD object is within the final forming temperature band. It will be understood that although the material binder is above its solidification temperature, the binder is below its melting temperature, and thus can be re-formed to an extent without requiring an undesirable magnitude of force and without and unacceptable rate of stress-induced structural defects.

In an aspect, operations in the compressing 1910 can be configured to remove a feature from the heat expansion molding of the IMD object.

Referring to FIG. 10, example operations in the compressing 1910 are shown as an in-process molded IMD object 1002, having indentation regions corresponding to the final form contours 116A.

In an aspect, the contact surface 602 of the end effector 110 can also include final form contours. In another aspect, the contact surface of the end effector 110 may include final form contours, and the final forming surface 116 of the lower forming base 114 may have form contours. For purposes of description, form contours on the final forming surface 116 of the lower forming base 114, e.g., form contours 116A, will be referred to as "lower" or "base" final form contours and final form contours on the contacting surface of the end effector, e.g., on the contact surface 602 shown on FIG. 6, will be referred to as "top", "upper" or "end effector" form contours.

Referring to FIG. 19, operations in the process 1900 can then proceed to continuing or maintaining 1912 the above-described compressions, until the in-process NWM molded 3D object cold to the solidification temperature 1901D of the binder.

Referring to FIGS. 1, and 2A-2B, 3, and 4, a vacuum pump system can be provided to facilitate removal of moisture, steam and the associated heat. An example is described in more detail in the '837 publication. As described after, or concomitantly with exhausting steam pressure from the separable mold 102, a vacuum pump can be used to pull a vacuum in the mold interior, e.g., the FIG. 2B mold interior 202. After a vacuum is pulled, the mold held with a vacuum pressure for another time interval. The vacuum pump can then be stopped the mold returned to ambient pressure, and the intermediate NWM molded 3D object removed. In another aspect, additional steps can be applied for pressurizing the mold multiple times, exhausting steam pressure, and applying vacuum pressure to the mold multiple times. It has been found that more uniform and fuller expansion within the mold may be obtained through controlling pressurization of the mold when applying steam inside of the mold, and controlling the application of a vacuum pressure inside the mold prior to removal of the part from the mold. Examples are described in more detail in the '837 publication.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one, or both of the limits, ranges excluding either or both of those included limits are also included in the invention.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

We claim:

1. A method for molding an object, comprising:
heat expanding a compressed nonwoven material (NWM) molding blank within a separable mold, forming an intermediate NWM molded three-dimensional (3D) object;
cooling the intermediate NWM molded 3D object, through a temperature band having an upper boundary and a lower boundary, and further cooling to a solidifying temperature of a binder, the lower boundary being higher than a solidifying temperature of the binder and the upper boundary being lower than the binder melting temperature;
while in the temperature band:
separating the separable mold, making accessible an exposed surface of the intermediate NWM molded 3D object,
gripping the intermediate NWM molded 3D object, by vacuum suction from an end effector of an actuatable arm,
transporting the gripped intermediate NWM molded 3D object to a forming surface of a forming base, by transport movements of the actuatable arm, and
compressing at least a portion of the intermediate NWM molded 3D object against the forming surface; and
finishing the intermediate NWM molded 3D object, by continuing the compressing at least the portion of the intermediate NWM molded 3D object against the forming surface until cooling to the solidifying temperature.

2. The method of claim 1, further comprising:
further finishing the intermediate NWM 3D molded object, by compressing at least another portion, or the at least the portion, or both, of the intermediate NWM 3D molded object against another finishing surface.

3. The method of claim 1, wherein transporting the intermediate NWM molded 3D further comprises:
a performing a movement sequence by the actuatable arm, effectuating a contact with the exposed surface, by a contact surface of the end effector;
establishing the vacuum gripping, by the contact surface end effectors, by a vacuum suction into openings on the contact surface, from a vacuum source that is fluidly connected, via fluid path conduits, to the openings on the contact surface; and
performing another movement sequence by the actuatable arm, configured to lift the gripped intermediate NWM molded 3D object from the separable mold, and transport the removed and gripped intermediate NWM molded 3D object to the forming surface of the forming base.

4. The method of claim 1, wherein:
the compressed NWM molding blank comprises a nonwoven material held in compression by a binder; and
the heat expanding includes heating the compressed NWM molding blank to a melting temperature of the binder.

5. The method of claim 4, wherein
the heat expanding includes heating the mold blank within an interior of the separable mold, the heating including a flowing of steam onto the mold blank, via steam heat conduits carried by an upper component, or a lower component, or both; and the method of further comprises:
- cooling the first form intermediate NWM molded 3D object from above the melting temperature of the binder includes an intra-mold cooling, within the separable mold, down to at least the upper boundary of the temperature band, the intra mold cooling including a vacuuming of steam or of condensation of steam, or of both, from within the interior of the separable mold.

6. The method of claim 1, wherein:
the exposed surface of the intermediate NWM molded 3D has an object surface contour;
the contact surface of the end effector is configured as a contoured contact surface conforming to the object surface contour, having an end effector final forming feature; and
finishing the intermediate NWM molded 3D object includes compressing another portion of the intermediate NWM molded 3D object against the end effector final forming feature, continuing the compressing against the end effector final forming feature until cooling to the solidification temperature.

7. The method of claim 6, wherein:
the contact surface of the end effector includes an end effector final forming feature; and
finishing the intermediate NWM molded 3D object includes compressing another portion of the intermediate NWM molded 3D object against the end effector final forming feature, and continuing the compressing against the end effector final forming feature until cooling to the solidification temperature.

8. The method of claim 1, wherein finishing the intermediate NWM molded 3D object includes:
arranging an embeddable attachment device in the end effector prior to the contact surface contacting an upper surface of the intermediate NWM molded 3D object;
configuring the contacting of the contact surface against the exposed surface of the intermediate NWM molded 3D object to embed or to partially embed the embeddable attachment device in the intermediate NWM molded 3D object.

9. The method of claim 1, wherein finishing the intermediate NWM molded 3D object includes:
arranging an embeddable attachment device on the contoured forming surface of the forming base prior to placing the NWM molded 3D object on the contoured forming surface; and
configuring the contacting of the contact surface against the exposed surface of the intermediate NWM molded 3D object to embed or to partially embed the embeddable attachment device in the intermediate NWM molded 3D object.

10. The method of claim 1, wherein heating the molding blank within the interior of the separable mold comprises:
routing a received steam into the interior of the separable mold, including a routing through steam conduits carried by an upper component of the separable mold, or steam conduits carried by a lower component, or both.

11. The method of claim 2, wherein:
a lower component of the separable mold comprises a surface that has at least some non-vertical sidewalls; and wherein
the finishing the intermediate NWM molded 3D object includes a compressing of a wall of the intermediate NWM molded 3D object, said wall having been formed by the surface that has at least some non-vertical sidewalls.

12. The method of claim 11, wherein the compressing further forms said wall to a vertical wall.

13. The method of claim 1, wherein:
a lower component of the separable mold provides, within the interior of the separable mold when assembled, a lower component interior molding surface that includes a relief-angled molding sidewall, having surface that extends in a plane that deviates by, a relief angle, from a true 90 degrees relative to a molding horizontal reference plane; and further comprising the steps of
heat expanding the compressed NWM molding blank within the interior of the separable mold expands a portion of the compressed NWM against the relief-angled molding sidewall, forming the intermediate NWM molded 3D object with a relief-angled sidewall; and
finishing the intermediate NWM molded 3D object includes providing the forming surface with a vertical 90 degree forming sidewall, and the compressing being configured to press the relief-angled sidewall against the vertical 90 degree forming sidewall, in manner re-forming the relief-angled sidewall to a vertical 90 degree NWM sidewall, and continuing the compressing the vertical 90 degree NWM sidewall against the vertical 90 degree forming sidewall until cooling to the solidifying temperature.

14. A method of molding an object, comprising:
providing a mold, wherein the mold has a top portion and a bottom portion, wherein the mold is configured to deliver heat from steam to the top portion and the bottom portion of the mold, and wherein the mold is configured to exhaust moisture from inside the mold by vacuum suction;
placing the expandable object in the mold to form a configuration using the heat from steam when the top portion is placed on the bottom portion of the mold with the expandable object positioned between the top portion and the bottom portion of the mold;
withdrawing the heat and moisture from the mold by applying vacuum suction to the mold during and/or after molding;
opening the mold so that the top portion separates from the bottom portion of the mold to expose at least some portion of the expandable object while the expandable object remains positioned on the bottom portion of the mold;
placing an expandable object contacting surface of an end effector apparatus onto the exposed portion of the expandable object while applying vacuum suction sufficient to cool and hold the expandable object against the expandable object contacting surface of the end effector apparatus, wherein the expandable object contacting surface of the end effector apparatus sets the configuration to a first configuration by cooling and holding;
retrieving the first configuration expandable object from the bottom portion of the mold; and
further forming the first configuration expandable object to a second configuration expandable object.

15. The method of claim 14, wherein the expandable object is a fiber-based nonwoven material.

16. A method of molding an object, comprising:
providing a mold, wherein the mold has a top portion and a bottom portion, wherein the mold is configured to deliver heat from steam to the top portion and the bottom portion of the mold, and wherein the mold is configured to exhaust moisture from inside the mold by vacuum suction;

placing the expandable object in the mold to form a configuration using the heat from steam when the top portion is placed on the bottom portion of the mold with the expandable object positioned between the top portion and the bottom portion of the mold;

withdrawing the heat and moisture from the mold by applying vacuum suction to the mold during and/or after molding;

opening the mold so that the top portion separates from the bottom portion of the mold to expose at least some portion of the expandable object while the expandable object remains positioned on the bottom portion of the mold;

placing an expandable object contacting surface of an end effector apparatus onto the exposed portion of the expandable object while applying vacuum suction sufficient to cool and hold the expandable object against the expandable object contacting surface of the end effector apparatus, wherein the expandable object contacting surface of the end effector apparatus sets the configuration to a first configuration by cooling and holding;

retrieving the first configuration expandable object from the bottom portion of the mold; and imparting one or more contours into one or more of a top surface and a side surface of the expandable object using one or more contoured expandable object contacting surfaces of the end effector which contact the first configuration expandable object during the retrieving step, wherein the one or more contours project into the one or more of the top surface and the side surface of the expandable object during the retrieving step.

17. The method of claim 14, wherein the retrieving step is performed using a robotic arm of the end effector apparatus which retrieves the first configuration expandable object held there against, and which moves the first configuration expandable object to a location away from the bottom portion of the mold.

18. A method of molding an object, comprising:

providing a mold, wherein the mold has a top portion and a bottom portion, wherein the mold is configured to deliver heat from steam to the top portion and the bottom portion of the mold, and wherein the mold is configured to exhaust moisture from inside the mold by vacuum suction;

placing the expandable object in the mold to form a configuration using the heat from steam when the top portion is placed on the bottom portion of the mold with the expandable object positioned between the top portion and the bottom portion of the mold;

withdrawing the heat and moisture from the mold by applying vacuum suction to the mold during and/or after molding;

opening the mold so that the top portion separates from the bottom portion of the mold to expose at least some portion of the expandable object while the expandable object remains positioned on the bottom portion of the mold;

placing an expandable object contacting surface of an end effector apparatus onto the exposed portion of the expandable object while applying vacuum suction sufficient to cool and hold the expandable object against the expandable object contacting surface of the end effector apparatus, wherein the expandable object contacting surface of the end effector apparatus sets the configuration to a first configuration by cooling and holding;

retrieving the first configuration expandable object from the bottom portion of the mold; and adding one or more connectors to a surface of the expandable object by placing the one or more connectors on the expandable object contacting surface of the end effector apparatus.

19. The method of claim 18, wherein the one or more connectors are selected from temperature activated fasteners or adhesives.

* * * * *